(12) United States Patent
Ide

(10) Patent No.: US 12,313,777 B2
(45) Date of Patent: May 27, 2025

(54) DISTANCE MEASURING DEVICE

(71) Applicant: Panasonic Intellectual Property Management Co., Ltd., Osaka (JP)

(72) Inventor: Kazuhisa Ide, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1241 days.

(21) Appl. No.: 17/088,052

(22) Filed: Nov. 3, 2020

(65) Prior Publication Data

US 2021/0072355 A1 Mar. 11, 2021

Related U.S. Application Data

(63) Continuation of application No. PCT/JP2019/020670, filed on May 24, 2019.

(30) Foreign Application Priority Data

Jun. 8, 2018 (JP) ................................. 2018-110680

(51) Int. Cl.
*G01S 7/481* (2006.01)
*G01S 17/08* (2006.01)

(52) U.S. Cl.
CPC .......... *G01S 7/4812* (2013.01); *G01S 7/4813* (2013.01); *G01S 17/08* (2013.01)

(58) Field of Classification Search
None
See application file for complete search history.

(56) References Cited

U.S. PATENT DOCUMENTS

| 6,317,202 B1 | 11/2001 | Hosokawa et al. |
| 2008/0239246 A1 | 10/2008 | Yamamoto |
| (Continued) | | |

FOREIGN PATENT DOCUMENTS

| DE | 19954362 A1 | 6/2000 |
| DE | 102014102420 A1 | 8/2015 |
| (Continued) | | |

OTHER PUBLICATIONS

International Search Report issued in correspondng International Patent Application No. PCT/JP2019/020670, dated Aug. 27, 2019, with English translation.

(Continued)

*Primary Examiner* — Isam A Alsomiri
*Assistant Examiner* — Sanjida Naser
(74) *Attorney, Agent, or Firm* — Rimon P.C.

(57) ABSTRACT

A distance measuring device applies laser light to a distance measurement region and measures a distance to an object that exists in the distance measurement region. The distance measuring device includes: a condensing lens configured to condense reflected light, of the laser light, reflected by the object; a tubular adjustment member disposed at a stage subsequent to the condensing lens and having a first reflecting surface and a second reflecting surface formed on an inner surface on which the reflected light condensed by the condensing lens is incident, a tilt angle of the second reflecting surface relative to an optical axis of the condensing lens being different from that of the first reflecting surface; and a photodetector configured to receive the reflected light that has traveled through the adjustment member.

4 Claims, 18 Drawing Sheets

(56) References Cited

U.S. PATENT DOCUMENTS

2014/0103199 A1    4/2014  Loong et al.
2015/0219763 A1    8/2015  Nubling
2016/0231424 A1*  8/2016  Li ........................ G01S 7/4813

FOREIGN PATENT DOCUMENTS

| EP | 2910969 A1 | 8/2015 |
|----|------------|--------|
| JP | S61-003486 U | 1/1986 |
| JP | H07-006782 U | 1/1995 |
| JP | 2007-139648 A | 6/2007 |
| JP | 2015-148605 A | 8/2015 |
| JP | 2018-028484 A | 2/2018 |

OTHER PUBLICATIONS

Extended European Search Report issued in corresponding European Patent Application No. EP19 815 099.7, dated Jun. 29, 2021.
First Office Action received in corresponding Chinese Patent Application No. 201980032845.X, issued Dec. 23, 2023.

* cited by examiner

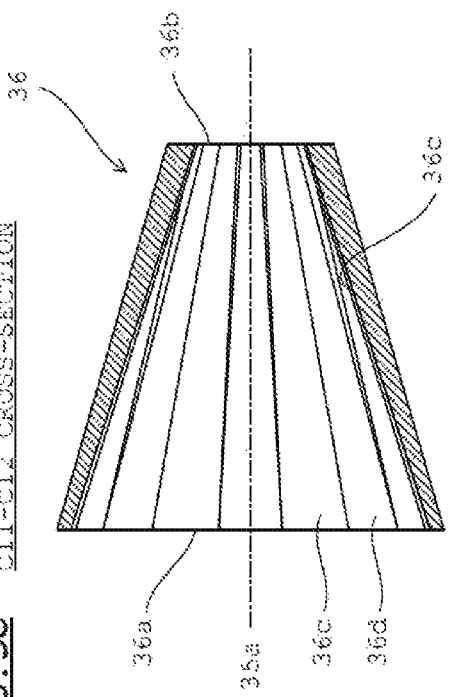
FIG. 3C  C11-C12 CROSS-SECTION
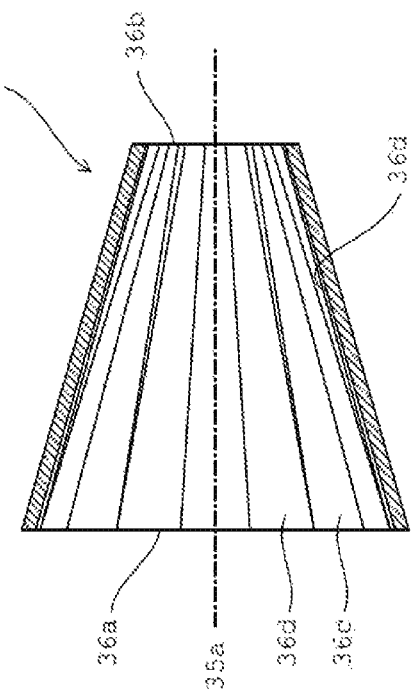
FIG. 3D  C21-C22 CROSS-SECTION
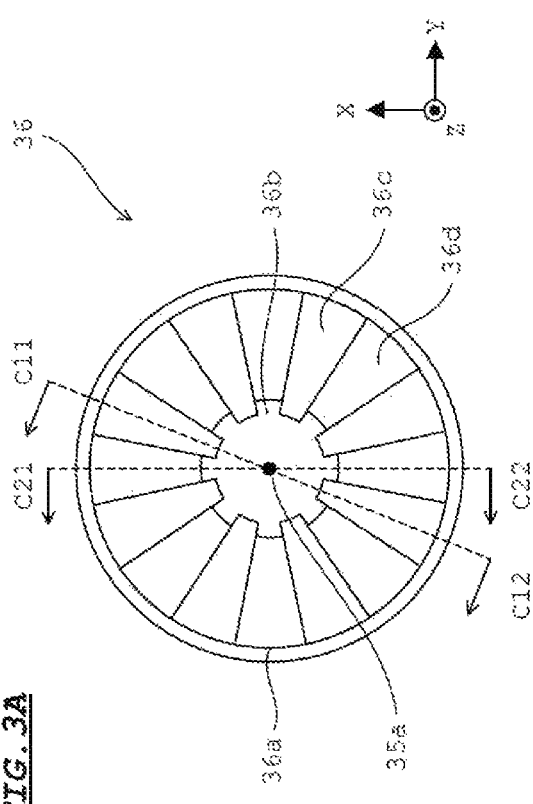
FIG. 3A
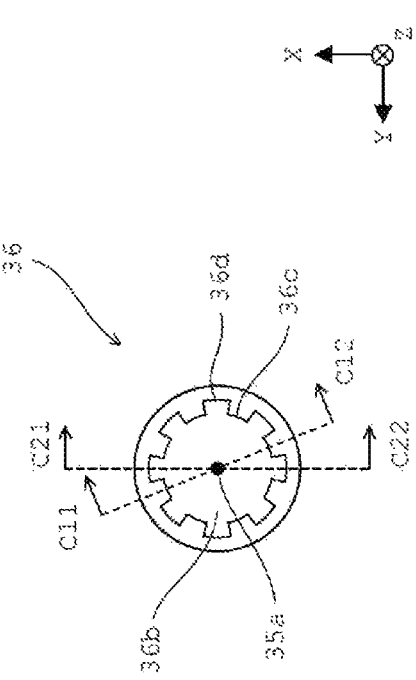
FIG. 3B

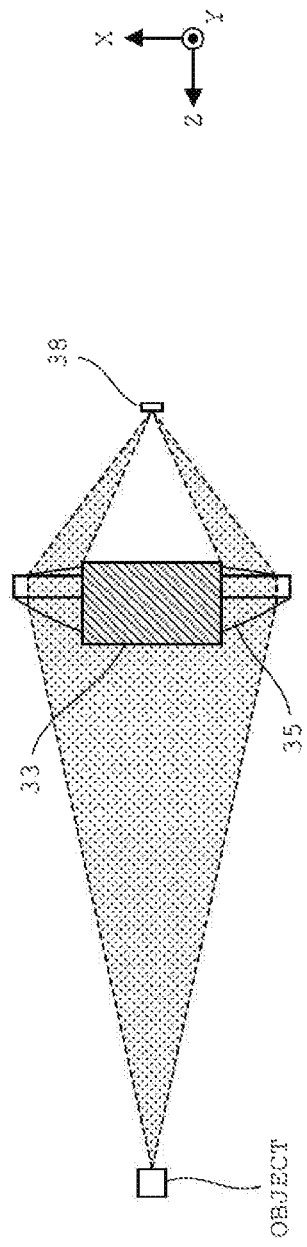
FIG. 4A  COMPARATIVE EXAMPLE
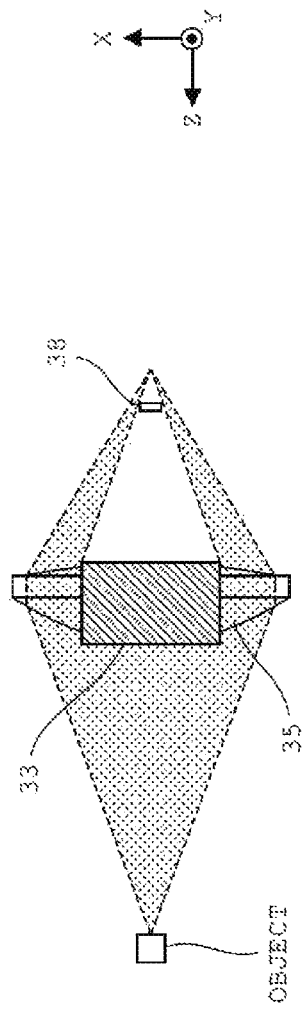
FIG. 4B  COMPARATIVE EXAMPLE

DISTANCE MEASURING DEVICE

CROSS REFERENCE TO RELATED APPLICATION

This application is a continuation of International Application No. PCT/JP2019/020670 filed on May 24, 2019, entitled "DISTANCE MEASURING DEVICE", which claims priority under 35 U.S.C. Section 119 of Japanese Patent Application No. 2018-110680 filed on Jun. 8, 2018, entitled "DISTANCE MEASURING DEVICE". The disclosure of the above applications is incorporated herein by reference.

BACKGROUND OF THE INVENTION

1. Field of the Invention

The present invention relates to a distance measuring device that measures the distance to an object using light.

2. Disclosure of Related Art

To date, a distance measuring device that measures the distance to an object using light has been mounted on various apparatuses. As a method for measuring a distance using light, for example, a method using the triangulation method has been known. In this method, a positional difference (parallax) between a light source that projects light to an object in a target region and a detection optical system including a condensing lens and a photodetector is provided, and a distance is measured by using the fact that the position at which an image is formed on the photodetector when the projected light is reflected and returned from an object is different depending on the distance to the object. However, in this method, in order to measure the distance to a far object, it is necessary to increase the parallax on the basis of the geometrical principle, so that the size of the distance measuring device is increased. As a method that can inhibit this problem, a method of measuring the distance to an object on the basis of the time difference (time of flight) from the emission of light to the reception of reflected light, etc., can be used.

Japanese Laid-Open Patent Publication No. 2015-148605 describes a laser scanner configured to rotate laser light using a mirror. In this laser scanner, a rotary substrate that rotates about a rotation center axis is provided, and an optical system for projection and reception of light is installed on the rotary substrate. Specifically, a light emitter is disposed such that the emission optical axis thereof coincides with the rotation center axis, and the mirror is disposed so as to be tilted at 45° relative to the rotation center axis. In addition, a condensing lens is disposed such that the optical axis thereof coincides with the rotation center axis, and a photodetector is further disposed on the rotation center axis.

The laser light emitted from the light emitter is reflected by the mirror in a direction perpendicular to the rotation center axis and projected to a target region. By rotation of the rotary substrate, the target region around the distance measuring device is scanned with the laser light. The reflected light from an object in the target region is reflected by the mirror and condensed on the photodetector by the condensing lens. Whether or not an object exists in the target region is determined on the basis of the presence/absence of reflected light. In addition, the distance to an object is measured by the time-of-flight method.

Generally, a distance measuring device measures the distance to an object in a predetermined distance range. In this case, for example, an optical system is configured such that reflected light from an object located at the farthest distance is condensed on a photodetector. However, with this configuration, as the object approaches the device, the condensed state of the reflected light on the photodetector is deteriorated. Thus, depending on the distance to the object, most of the reflected light may deviate from the photodetector, and it may be impossible to properly measure the distance to the object. This problem becomes more significant as the distance range for distance measurement becomes wider.

SUMMARY OF THE INVENTION

A first aspect of the present invention is directed to a distance measuring device for applying laser light to a distance measurement region and measuring a distance to an object that exists in the distance measurement region. The distance measuring device according to this aspect includes: a condensing lens configured to condense reflected light, of the laser light, reflected by the object; a tubular adjustment member disposed at a stage subsequent to the condensing lens and having a first reflecting surface and a second reflecting surface formed on an inner surface on which the reflected light condensed by the condensing lens is incident, a tilt angle of the second reflecting surface relative to an optical axis of the condensing lens being different from that of the first reflecting surface; and a photodetector configured to receive the reflected light that has traveled through the adjustment member.

In the distance measuring device according to this aspect, since the tilt angles of the first reflecting surface and the second reflecting surface are different from each other, the position on which reflected light reflected by the first reflecting surface is condensed and the position on which reflected light reflected by the second reflecting surface is condensed are displaced in a direction parallel to the light receiving surface of the photodetector. Therefore, when the distance to an object is changed, the reflected light reflected by the first reflecting surface and the reflected light reflected by the second reflecting surface complementarily approach and become separated from the light receiving surface of the photodetector. Thus, even when the distance to the object is changed, the reflected light can be guided to the photodetector. Accordingly, the distance to the object can be properly measured.

A second aspect of the present invention is directed to a distance measuring device for applying laser light to a distance measurement region and measuring a distance to an object that exists in the distance measurement region. The distance measuring device according to this aspect includes: a condensing lens configured to condense reflected light, of the laser light, reflected by the object; a conical first reflecting surface and a conical second reflecting surface that are provided at a stage subsequent to the condensing lens and on which the reflected light condensed by the condensing lens is incident; and a photodetector configured to receive the reflected light that has traveled through the first reflecting surface and the second reflecting surface. A tilt angle of the second reflecting surface relative to an optical axis of the condensing lens is different from that of the first reflecting surface.

With the distance measuring device according to this aspect, the same advantageous effects as those of the first aspect can be achieved.

BRIEF DESCRIPTION OF THE DRAWINGS

The above and other objects and new features of the present invention will be fully clarified by the following description of the embodiment, when read in conjunction with accompanying drawings.

FIG. 3A is a plan view of a lens barrel according to Embodiment 1 as viewed in a direction parallel to the optical axis of a condensing lens, specifically, as viewed from the reflected light incident side;

FIG. 3B is a plan view of the lens barrel according to Embodiment 1 as viewed in the direction parallel to the optical axis of the condensing lens, specifically, as viewed from the reflected light emission side;

FIGS. 3C and 3D are each a cross-sectional view of the lens barrel according to Embodiment 1, taken along a plane parallel to the optical axis of the condensing lens, as viewed from the side;

FIGS. 4A and 4B are each a diagram schematically showing a flux of light reflected by an object in a distance measurement region according to a comparative example;

It should be noted that the drawings are solely for description and do not limit the scope of the present invention by any degree.

DESCRIPTION OF THE PREFERRED EMBODIMENTS

Hereinafter, an embodiment of the present invention will be described with reference to the drawings. For convenience, in each drawing, X, Y, and Z axes that are orthogonal to each other are additionally shown. The Z-axis positive direction is the height direction of a distance measuring device 1.

Embodiment 1

Figure 1:
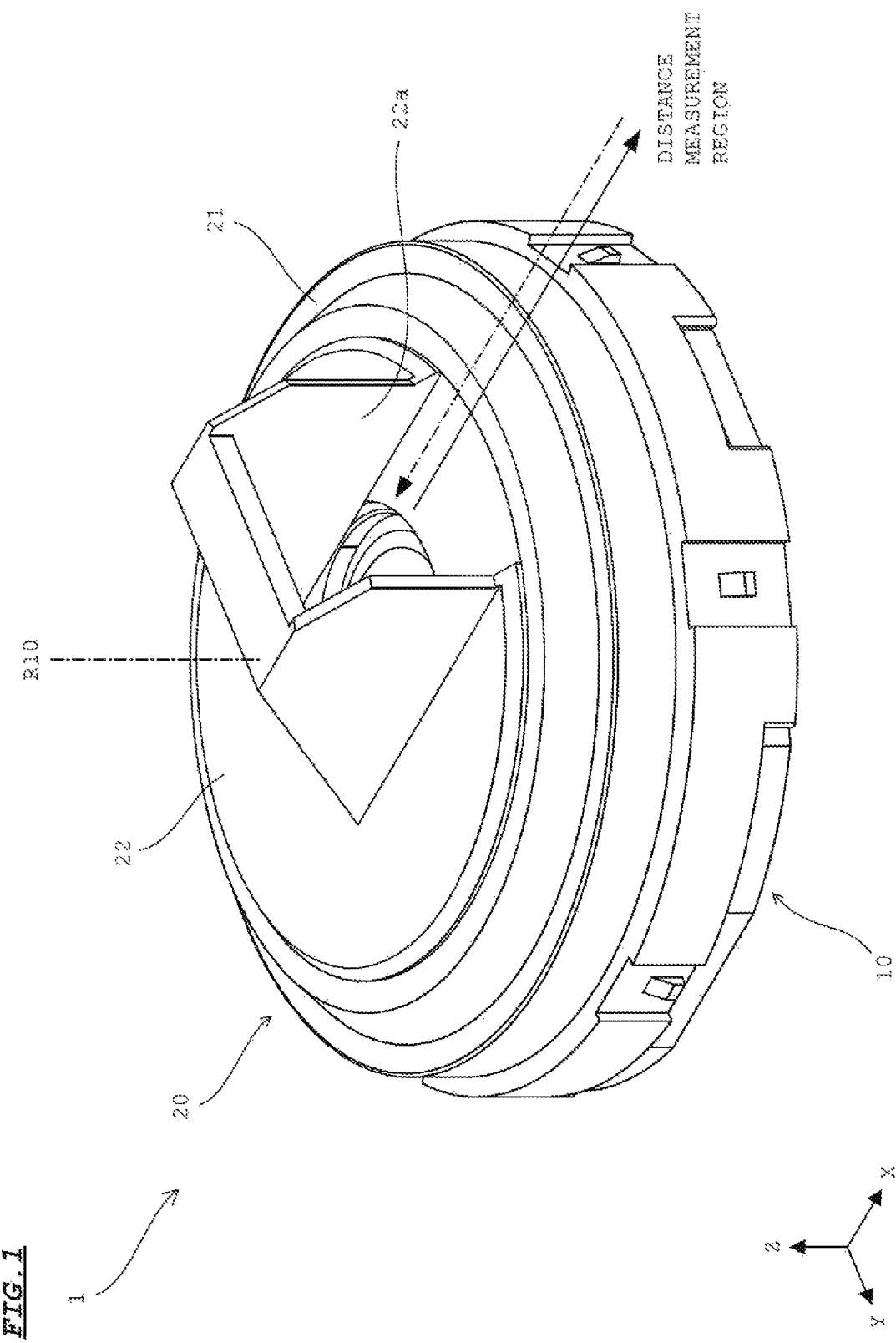
FIG. 1 is a perspective view showing a configuration of a distance measuring device according to Embodiment 1.

FIG. 1 is a perspective view showing a configuration of the distance measuring device 1.

As shown in FIG. 1, the distance measuring device 1 includes a cylindrical fixing part 10 and a rotary part 20 that is rotatably disposed on the fixing part 10. The rotary part 20 includes two support members 21 and 22 having diameters different from each other. The rotary part 20 is configured such that the support member 22 is installed on the upper surface of the support member 21. An opening 22a is provided in a side surface of the support member 22. Laser light (projection light) is projected from the opening 22a toward a distance measurement region, and reflected light, of the laser light, reflected in the distance measurement region is taken into the inside of the distance measuring device 1 through the opening 22a.

The rotary part 20 rotates about a rotation center axis R10 that is parallel to the Z axis and extends through the center of the rotary part 20. As the rotary part 20 rotates, the optical axis of the laser light projected from the opening 22a rotates about the rotation center axis R10. Accordingly, the distance measurement region (position scanned with the laser light) also rotates. As will be described later, the distance measuring device 1 measures the distance to an object that exists in the distance measurement region, on the basis of the time difference (time of flight) between the timing when the laser light is projected to the distance measurement region and the timing when the reflected light of the laser light from the distance measurement region is received. When the rotary part 20 makes one rotation about the rotation center axis R10 as described above, the distance measuring device 1 can measure the distances to objects that exist in a range of 360 degrees around the distance measuring device 1.

Figure 2:
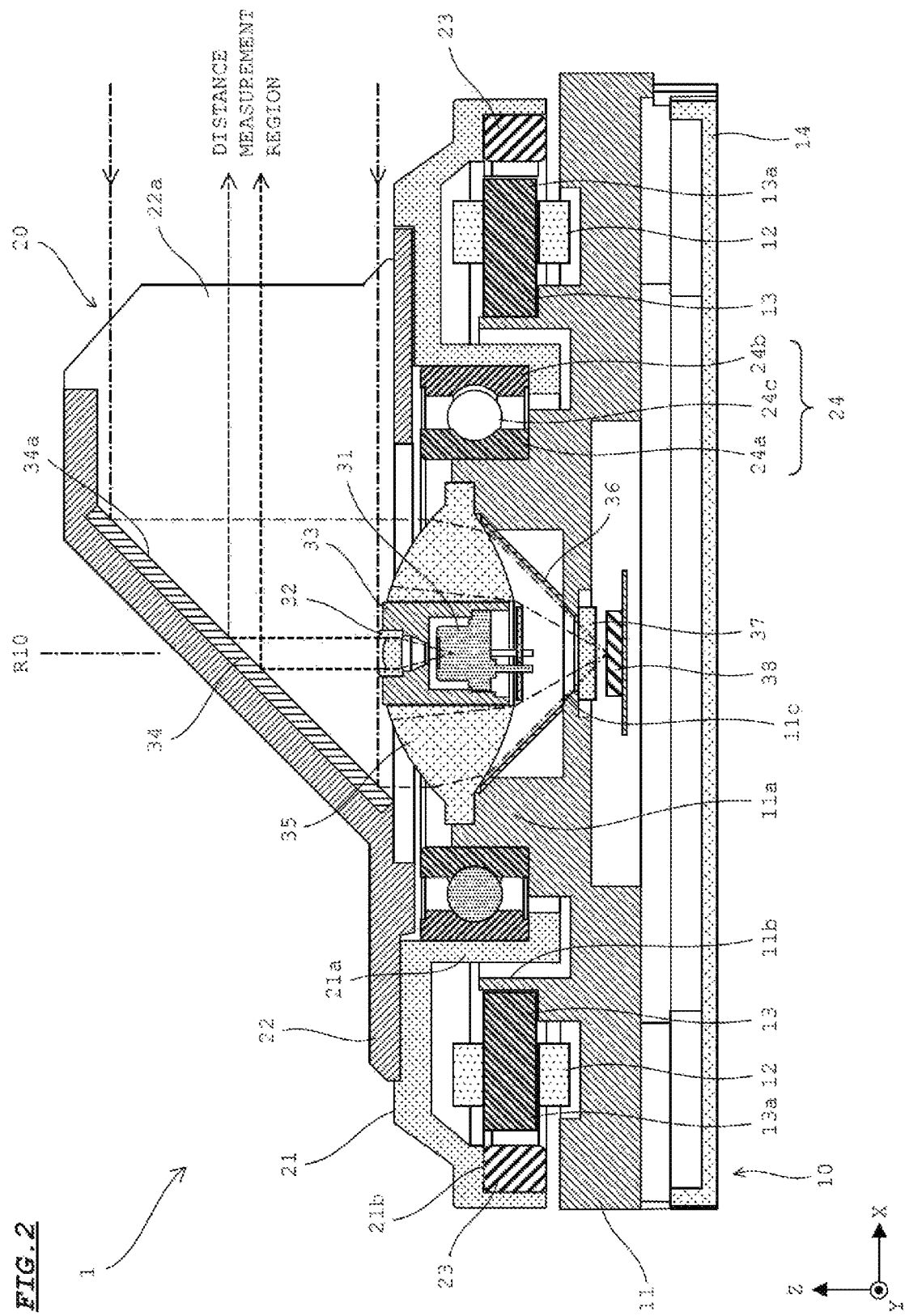
FIG. 2 is a cross-sectional view showing the configuration of the distance measuring device according to Embodiment 1.

FIG. 2 is a cross-sectional view showing the configuration of the distance measuring device 1.

FIG. 2 shows a cross-sectional view when the distance measuring device 1 shown in FIG. 1 is cut at the center position in the Y-axis direction along a plane parallel to the XZ plane. In FIG. 2, laser light (projection light) emitted from a light source 31 and travelling toward the distance measurement region is indicated by broken lines, and reflected light reflected from the distance measurement region is indicated by alternate long and short dash lines.

As shown in FIG. 2, the fixing part 10 includes a cylindrical support base 11, a plurality of coils 12, a yoke 13, and a cover 14. The support base 11 is formed from, for example, a resin. The lower surface of the support base 11 is covered with the cover 14 having a circular plate shape.

The support member 21 is installed on the support base via a cylindrical bearing 24. The bearing 24 has a configuration in which a plurality of bearing balls 24c are arranged between an inner cylinder 24a and an outer cylinder 24b so as to be aligned in the circumferential direction. A cylindrical tube portion 21a that projects in the Z-axis negative direction is formed in the support member 21, and a cylindrical tube portion 11a that projects in the Z-axis positive direction is formed in the support base 11. The outer diameter of the tube portion 11a is slightly larger than the inner diameter of the inner cylinder 24a of the bearing 24, and the inner diameter of the tube portion 21a is slightly smaller than the outer diameter of the outer cylinder 24b of the bearing 24. The bearing 24 is fitted between the tube portion 11a and the tube portion 21a, and the support member 21 is supported by the support base 11 so as to be rotatable about the rotation center axis R10.

In the support base 11, a cylindrical wall portion 11b is formed on the outer side of the tube portion 11a. The central axis of the wall portion 11b is aligned with the rotation center axis R10. The yoke 13 is fitted on the outer periphery of the wall portion 11b. The yoke 13 includes a plurality of projection portions 13a that radially protrude from a ring-shaped base portion. The intervals between the projection portions 13a in the circumference direction are constant. The coils 12 are wound and mounted on the projection portions 13a, respectively.

A step portion 21b is formed on an outer peripheral portion of the support member 21 so as to be continuous in the circumferential direction. A plurality of magnets 23 are installed on the step portion 21b without any gap in the circumferential direction. The adjacent magnets 23 have different polarities on the inner side.

These magnets 23 face the projection portions 13a of the yoke 13. Therefore, by controlling a current to the coils 12, the rotary part 20 is rotationally driven about the rotation center axis R10. The coils 12, the yoke 13, and the bearing 24 form a drive unit that rotates a mirror 34 together with the rotary part 20 about the rotation center axis R10.

The distance measuring device 1 includes the light source 31, a collimator lens 32, a holder 33, the mirror 34, a condensing lens 35, a lens barrel 36, a filter 37, and a photodetector 38 as components of an optical system. The light source 31 is held by the holder 33 together with the collimator lens 32.

The light source 31 emits laser light having a predetermined wavelength. The light source 31 is, for example, a semiconductor laser. The emission optical axis of the light source 31 is parallel to the Z axis. The laser light emitted from the light source 31 is converted into parallel light by the collimator lens 32. The laser light converted into parallel light is incident on the mirror 34 disposed above the condensing lens 35. The light source 31 and the collimator lens 32 are installed in the condensing lens 35 in a state where the light source 31 and the collimator lens 32 are held by the holder 33. A circular opening is formed at the center of the condensing lens 35 so as to vertically penetrate the condensing lens 35, and the holder 33 having a columnar shape is fitted and installed in the opening.

The mirror 34 is a reflection mirror having a reflecting surface 34a on one surface thereof. The center position of the reflecting surface 34a is substantially aligned with the rotation center axis R10. The reflecting surface 34a has a substantially square shape as viewed in the Z-axis direction. The mirror 34 is installed on the support member 22 of the rotary part 20 such that the reflecting surface 34a is tilted at 45° relative to the rotation center axis R10.

The laser light that is incident on the mirror 34 via the collimator lens 32 is reflected by the mirror 34 in a direction perpendicular to the rotation center axis R10. Thereafter, the laser light is projected through the opening 22a to the distance measurement region.

When an object exists in the distance measurement region, the laser light projected from the opening 22a to the distance measurement region is reflected by the object and travels toward the opening 22a again. The reflected light reflected from the object as described above is taken in through the opening 22a and guided to the mirror 34. Thereafter, the reflected light is reflected by the mirror 34 in the Z-axis negative direction. The reflected light reflected by the mirror 34 undergoes a convergence action by the condensing lens 35.

Thereafter, the reflected light is converged on the photodetector 38 via the lens barrel 36, a hole 11c formed in the support base 11, and the filter 37. The central axis of the lens barrel 36 and the optical axis of the condensing lens 35 coincide with the rotation center axis R10. The configuration of the lens barrel 36 will be described later with reference to FIGS. 3A to 3D. The filter 37 transmits light in the wavelength band of the laser light emitted from the light source 31 and blocks light in the other wavelength bands.

The photodetector 38 outputs a detection signal corresponding to the amount of received light. The photodetector 38 is composed of, for example, a PIN photodiode or an avalanche photodiode. The detection signal from the photodetector 38 is outputted to a circuitry disposed on a circuit board that is not shown.

In Embodiment 1, due to the configuration in which the light source 31 and the collimator lens 32 are installed in the condensing lens 35, a part of the reflected light taken in through the opening 22a is blocked by the holder 33 and is not condensed onto the photodetector 38. For example, most of the reflected light in the range indicated by the alternate long and short dash lines around the center of the condensing lens 35 in FIG. 2 is blocked by the holder 33.

FIGS. 3A and 3B are plan views of the lens barrel 36 as viewed in the Z-axis negative direction and the Z-axis positive direction, respectively. FIGS. 3C and 3D show cross-sectional surfaces that are a cross-section C11-C12 and a cross-section C21-C21 when the lens barrel 36 is cut along planes parallel to the Z-axis direction, respectively. In FIGS. 3A to 3D, the optical axis 35a of the condensing lens 35 is shown. As described above, the optical axis 35a coincides with the rotation center axis R10 and the central axis of the lens barrel 36.

As shown in FIGS. 3A to 3D, the lens barrel 36 is a tubular member having a hole that penetrates the member in the Z-axis direction. Openings 36a and 36b are formed in end portions on the Z-axis positive side and the Z-axis negative side of the lens barrel 36 so as to be connected to the inner surface of the lens barrel 36.

Eight reflecting surfaces 36c and eight reflecting surfaces 36d are formed on the inner surface of the lens barrel 36. The reflecting surfaces 36c and 36d are curved surfaces along the circumferential direction on the inner surface of the lens barrel 36. That is, the reflecting surfaces 36c coincide with a predetermined conical surface, and the reflecting surfaces 36d coincide with a conical surface having an apex angle different from that of the conical surface with which the reflecting surfaces 36c coincide. The reflecting surfaces 36c and 36d are alternately provided along the circumferential direction on the inner surface of the lens barrel 36. The angle formed between each reflecting surface 36c and the optical axis 35a is larger than the angle formed between each reflecting surface 36d and the optical axis 35a. The reflecting surfaces 36c and 36d reflect the reflected light having entered the inside of the lens barrel 36.

The lens barrel 36 is formed from, for example, a resin such as polycarbonate. When the lens barrel 36 is molded from the resin, the reflecting surfaces 36c and 36d are formed as reflecting surfaces that reflect light. After the lens barrel 36 is molded, the reflecting surfaces 36c and 36d may be formed by providing a reflection film on the inner surface of the lens barrel 36, or by performing mirror finish on the inner surface of the lens barrel 36. In addition to the resin, the lens barrel 36 may be formed from a metal such as aluminum, glass, or the like.

In Embodiment 1, two reflecting surfaces 36c are provided at positions symmetrical with respect to the optical axis 35a, and two reflecting surfaces 36d are provided at positions symmetrical with respect to the optical axis 35a. That is, the reflecting surfaces 36c and the reflecting surfaces 36d are provided at positions asymmetrical with respect to the optical axis 35a. The shapes of the eight reflecting surfaces 36c are all the same, and the shapes of the eight reflecting surfaces 36d are also all the same.

FIGS. 4A and 4B are each a diagram schematically showing a flux of light reflected by an object in a distance measurement region in the case of a comparative example, and show a cross-section of each portion taken along the X-Z plane passing through the rotation center axis R10. In FIGS. 4A and 4B, for convenience, the filter 37 is not shown. As shown in FIGS. 4A and 4B, in the configuration of the comparative example, the lens barrel 36 is omitted as compared to the configuration of Embodiment 1 shown in FIG. 2.

The amount of light taken into the opening 22a of the distance measuring device 1 becomes smaller when a object to be measured for distance is located at a position farther from the distance measuring device 1. That is, the amount of light taken into the opening 22a is inversely proportional to the square of the distance to the object. Therefore, as shown in the comparative example of FIG. 4A, generally, the photodetector 38 is disposed at a position at which light from an object to be measured for distance located at a position far from the distance measuring device 1 is converged on the photodetector 38 by the condensing lens 35. With such a configuration, weak light from an object located at a far position can be satisfactorily received.

However, in the case where the photodetector 38 is disposed on the basis of an object located at a far position as shown in FIG. 4A, light condensed by the condensing lens 35 may deviate from the photodetector 38 when an object to be measured for distance is located at a close position as shown in FIG. 4B. Therefore, in the case of the comparative example, light from an object located at a far position can be properly received, but light from an object located at a close position cannot be properly received. On the other hand, in Embodiment 1, not only when an object is located at a far position, but also when an object is located at a close position, reflected light is guided to the photodetector 38 by the action of the lens barrel 36.

Hereinafter, the action of the lens barrel 36 will be described with reference to FIG. 5A to FIG. 6C. FIG. 5A to FIG. 6C show simulation results obtained by the inventor performing simulation of rays of reflected light passing through the lens barrel 36.

Figure 5C:
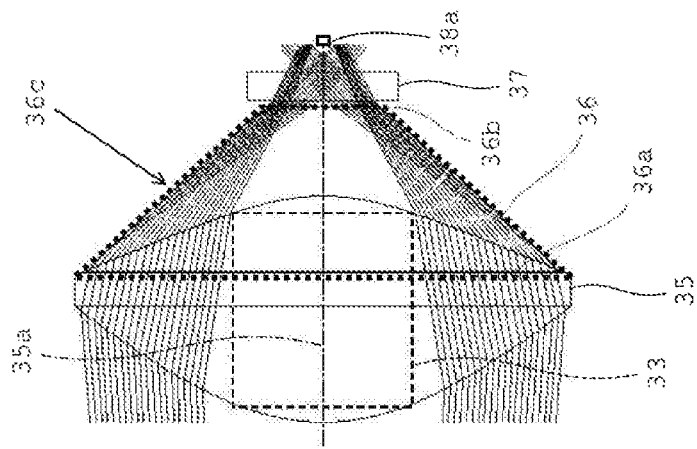
FIGS. 5A to 5C each show simulation results obtained by performing simulation of rays of reflected light passing through the lens barrel according to Embodiment 1.
Figure 5B:
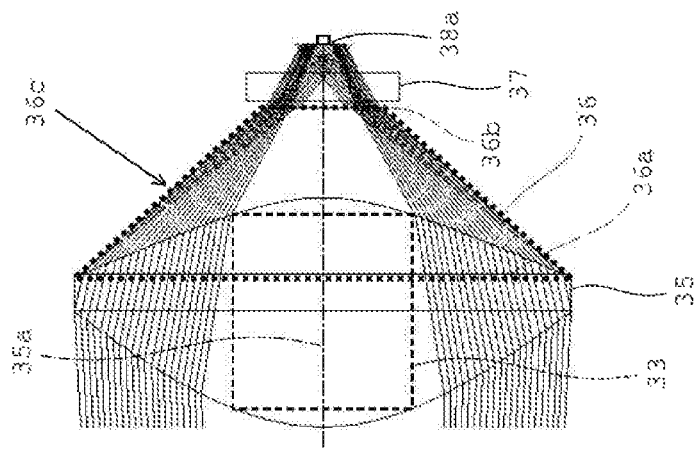

Similar to FIG. 3C, FIGS. 5A to 5C are each a side view when a cross-sectional surface obtained by cutting along a plane passing through the reflecting surfaces 36c and the optical axis 35a of the condensing lens 35 is viewed from the side. Similar to FIG. 3D, and FIGS. 6A and 6C are each a side view when a cross-sectional surface obtained by cutting along a plane passing through the reflecting surfaces 36d and the optical axis 35a of the condensing lens 35 is viewed from the side. In FIG. 5A to FIG. 6C, a flux of reflected light incident on the condensing lens 35 is schematically shown.

In this simulation, an effective diameter $\varphi 1$ of the condensing lens 35 is set to 18.4 mm, a diameter $\varphi 2$ of the holder 33 is set to 6.4 mm, a diameter $\varphi 3$ of a light receiving surface 38a of the photodetector 38 is set to 0.2 mm, the internal diffuse reflectance of the lens barrel 36 is set to 10%, and a thickness d1 of the filter 37 is set to 1.1 mm. An angle $\theta 1$ formed between the optical axis 35a and each reflecting surface 36c is set to 48°, and an angle $\theta 2$ formed between the optical axis 35a and each reflecting surface 36d is set to 46°. The focal distance of the condensing lens 35 is set to 8.9 mm, and the reflective index of the filter 37 is set to 1.5. The lens barrel 36 is disposed such that the opening 36a on the incident side of the lens barrel 36 closes the emission surface of the condensing lens 35.

Under the conditions, the inventor has performed simulation of rays with the distance to an object to be measured for distance, being changed between 80 mm to 6000 mm. In this simulation, the magnification of the optical system is set such that, when the distance to the object is 6000 mm (maximum), light from a point light source (object) on the optical axis 35a of the condensing lens 35 is converged on the photodetector 38 without being substantially reflected by the reflecting surfaces 36c and 36d of the lens barrel 36, that is, the outermost rays of the reflected light condensed by the condensing lens 35 travel along the reflecting surfaces 36c.

Figure 5A:
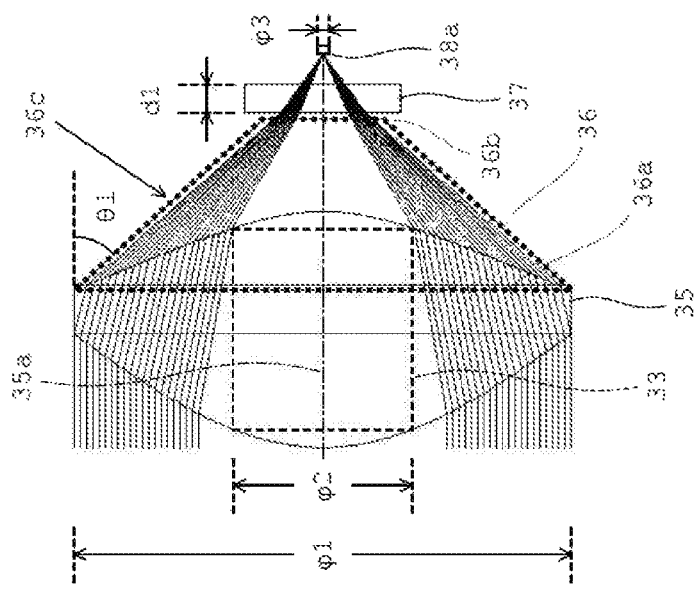
Figure 6C:
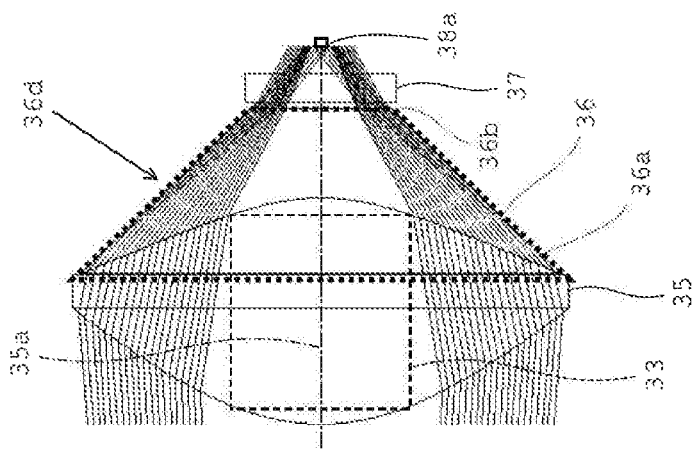
FIGS. 6A to 6C each show simulation results obtained by performing simulation of rays of reflected light passing through the lens barrel according to Embodiment 1.
Figure 6B:
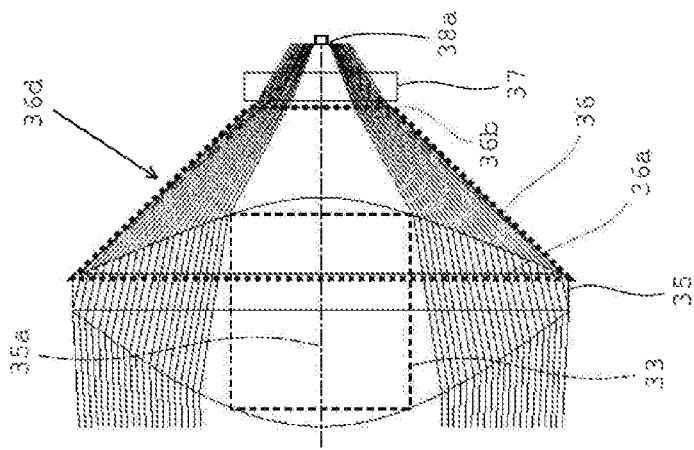
Figure 6A:
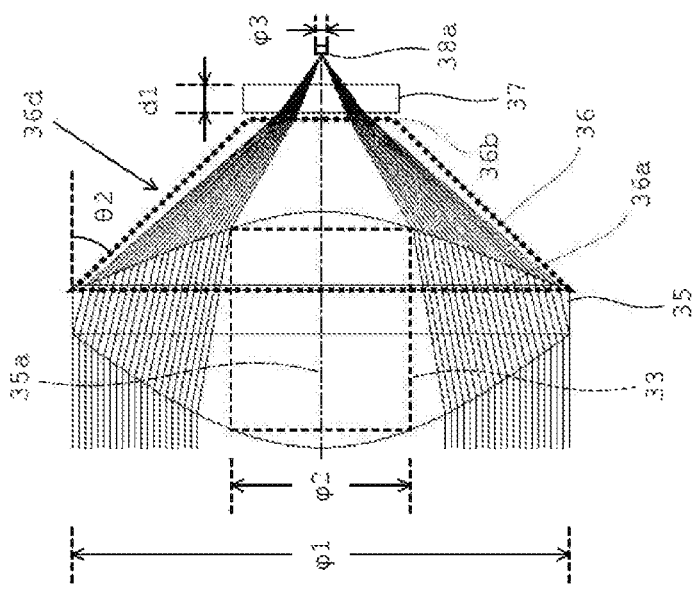

When the distance to the object is 6000 mm, as shown in FIG. 5A and FIG. 6A, the reflected light condensed by the condensing lens 35 is incident on the filter 37 through the inside of the lens barrel 36 and converged on the light receiving surface 38a.

When the distance to the object is 250 mm, as shown in FIG. 5B and FIG. 6B, a part of the rays of the reflected light is incident on the reflecting surfaces 36c and 36d, reflected by the reflecting surfaces 36c and 36d, and guided to the photodetector 38.

That is, in FIG. 5B, of the reflected light condensed by the condensing lens 35, the reflected light passing through positions close to the optical axis 35a travels through the opening 36b on the emission side of the lens barrel 36 without being reflected by the reflecting surfaces 36c, and thus is not substantially incident on the light receiving surface 38a. On the other hand, of the reflected light condensed by the condensing lens 35, the reflected light passing through positions far from the optical axis 35a is reflected by the reflecting surfaces 36c, and the direction thereof is changed to a direction approaching the optical axis 35a. Thus, this reflected light is incident on the light receiving surface 38a.

In addition, in FIG. 6B, of the reflected light condensed by the condensing lens 35, the reflected light passing through positions close to the optical axis 35a travels through the opening 36b on the emission side of the lens barrel 36 without being reflected by the reflecting surfaces 36d, and thus is not substantially incident on the light receiving surface 38a. On the other hand, of the reflected light condensed by the condensing lens 35, the reflected light passing through positions far from the optical axis 35a is reflected by the reflecting surfaces 36d, but the angle by which the direction thereof is changed due to the reflection is small. Thus, this reflected light is not substantially incident on the light receiving surface 38a.

When the distance to the object is 80 mm, as shown in FIG. 5C and FIG. 6C, the angle at which the reflected light is reflected by the reflecting surfaces 36c and 36d is larger than that in FIG. 5B and FIG. 6B.

In this case, in FIG. 5C, the reflected light passing through positions close to the optical axis 35a is guided through the opening 36b on the emission side of the lens barrel 36 to positions away from the light receiving surface 38a, and thus is not substantially incident on the light receiving surface 38a, similar to the case of FIG. 5B. On the other hand, the reflected light passing through positions far from the optical axis 35a is reflected by the reflecting surfaces 36c in a direction closer to the optical axis 35a, as compared to the case of FIG. 5B, and thus deviates from the light receiving surface 38a.

In addition, in FIG. 6C, the reflected light passing through positions close to the optical axis 35a is guided through the opening 36b on the emission side of the lens barrel 36 to positions away from the light receiving surface 38a, and thus is not substantially incident on the light receiving surface 38a, similar to the case of FIG. 5C. On the other hand, the reflected light passing through positions far from the optical axis 35a is reflected by the reflecting surfaces 36d in a direction closer to the optical axis 35a, as compared to the case of FIG. 6B, and thus is incident on the light receiving surface 38a.

From the above simulation results regarding rays, it is found that, even when the distance to the object is shorter than 6000 mm, under the above-described conditions, at least a part of reflected light is guided to the light receiving surface 38a by either of the reflecting surfaces 36c and 36d.

The optical system of the distance measuring device 1 shown in FIG. 2 is configured such that, as shown in FIG. 5A to FIG. 6C, at least a part of reflected light is guided to the light receiving surface 38a of the photodetector 38. That is, the tilt angles and the widths (areas) of the reflecting surfaces 36c and the reflecting surfaces 36d are adjusted such that, in a distance measurement range, reflected light from the reflecting surfaces 36c and reflected light from the reflecting surfaces 36d are complementarily and efficiently incident on the light receiving surface 38a of the photodetector 38. Accordingly, in the distance measuring device 1, at least a part of reflected light can be guided to the light receiving surface 38a of the photodetector 38 even when the distance to an object is changed.

Subsequently, the inventor has performed simulation with the case where the lens barrel 36 is omitted, as Comparative Example 1, with the case where the reflecting surfaces 36c are formed over the entirety in the circumferential direction of the inner surface of the lens barrel 36, as Comparative Example 2, and with the case where the reflecting surfaces 36d are formed over the entirety in the circumferential direction of the inner surface of the lens barrel 36, as Comparative Example 3. Also in this simulation, the angle θ1 formed between the optical axis 35a and each reflecting surface 36c is set to 48° (Comparative Example 2), and the angle θ2 formed between the optical axis 35a and each reflecting surface 36d is set to 46° (Comparative Example 3). The other conditions are set to be the same as those for the above verification.

Figure 7:
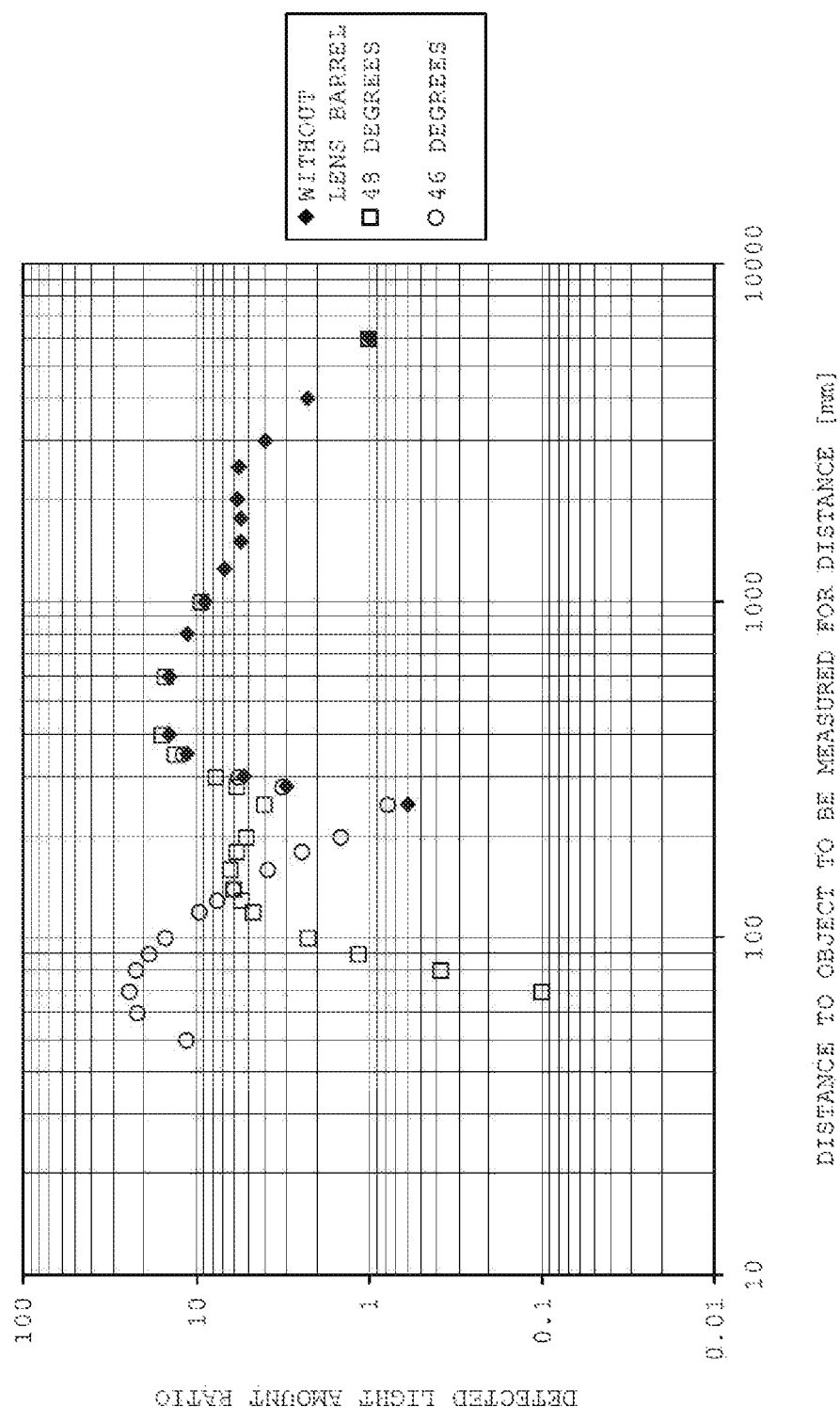
FIG. 7 is a graph showing simulation results according to Comparative Examples 1 to 3.

FIG. 7 is a graph showing simulation results (change of a detected light amount ratio) of Comparative Examples 1 to 3. The detected light amount ratio is the ratio of the amount of light received by the photodetector 38 to the maximum light amount. The horizontal axis indicates the distance (mm) to an object to be measured for distance, and the vertical axis indicates the detected light amount ratio in the case where the detected light amount is defined as 1 when the distance is 6000 mm.

In the case of Comparative Example 1, that is, in the case where the lens barrel 36 is not used, the amount of detected light rapidly decreases when the distance to the object is short. Meanwhile, in the case of Comparative Example 2, that is, in the case where only the reflecting surfaces 36c are formed, even if the distance to the object is short, the amount of detected light is maintained at a high level when the distance to the object is 140 mm to 300 mm. However, in the case of Comparative Example 2, the amount of detected light rapidly decreases when the distance to the object is shorter than 140 mm. In the case of Comparative Example 3, that is, in the case where only the reflecting surfaces 36d are formed, the amount of detected light is maintained at a high level when the distance to the object is 140 mm or less. However, in the case of Comparative Example 3, the amount of detected light rapidly decreases when the distance to the object is longer than 140 mm.

From the results, it is found that, in the case where the lens barrel 36 is not used, reflected light cannot be properly received when the distance to an object is short. In addition, it is found that, with the reflecting surfaces 36c, reflected light can be properly received when the distance is 140 mm to 300 mm, and, with the reflecting surfaces 36d, reflected light can be properly received when the distance is 140 mm or less. Therefore, it is found that, when the reflecting surfaces 36c and 36d are alternately provided in the circumferential direction on the inner surface of the lens barrel 36 as in Embodiment 1, even if the distance to an object is short, a decrease in the amount of detected light is inhibited, and the amount of detected light can be maintained at a high level.

Figure 8:
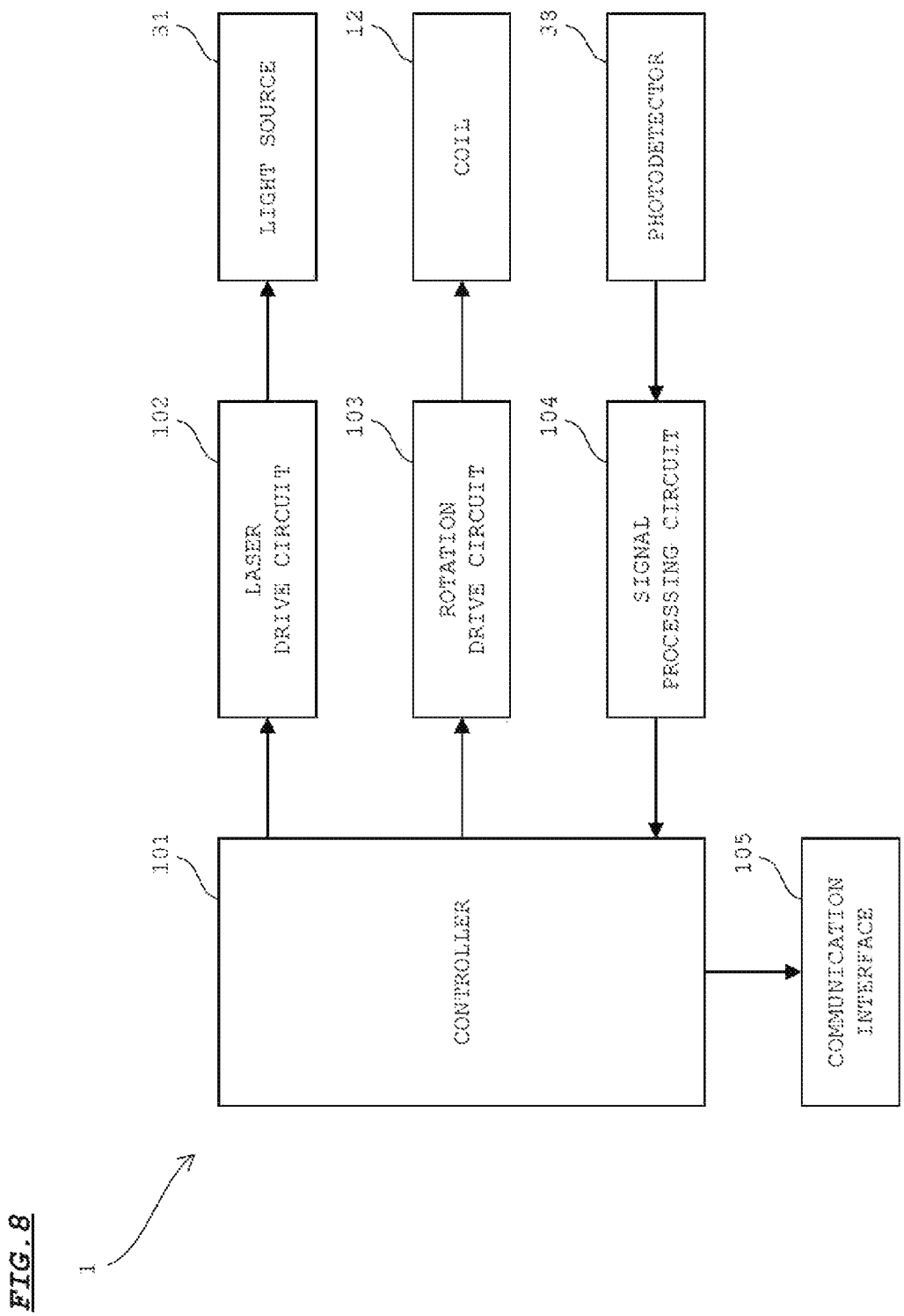
FIG. 8 is a diagram showing a configuration of a circuitry of the distance measuring device according to Embodiment 1.

FIG. 8 is a diagram showing a configuration of the circuitry of the distance measuring device 1.

As shown in FIG. 8, the distance measuring device 1 includes a controller 101, a laser drive circuit 102, a rotation drive circuit 103, and a signal processing circuit 104 as components of the circuitry.

The controller 101 includes an arithmetic processing circuit such as a CPU (central processing unit), and a memory, and controls each part according to a predetermined control program. The laser drive circuit 102 drives the light source 31 in accordance with the control from the controller 101. The rotation drive circuit 103 causes a current to flow through the coils 12 in accordance with the control from the controller 101. For example, the controller 101 controls the rotation drive circuit 103 such that the rotary part 20 rotates at a predetermined rotation speed. Accordingly, the magnitude and the timing of the current to be caused to flow from the rotation drive circuit 103 through the coils 12 are adjusted.

The signal processing circuit 104 performs amplification and noise removal processing on the detection signal inputted from the photodetector 38, and outputs the resultant signal to the controller 101. A communication interface 105 is an interface for performing communication with an apparatus in which the distance measuring device 1 is installed.

In a distance measurement operation, while controlling the rotation drive circuit 103 to rotate the mirror 34 together with the rotary part 20, the controller 101 controls the laser drive circuit 102 to output laser light of a predetermined pulse from the light source 31 at each predetermined timing. The controller 101 detects the timing when the laser light pulse emitted at each emission timing is received, on the basis of the detection signal of the photodetector 38 inputted from the signal processing circuit 104. Then, the controller 101 measures the distance to an object that exists in the distance measurement region at each emission timing, on the basis of the time difference (time of flight) between the timing when the laser light is emitted and the timing when the laser light is received.

The controller 101 transmits data of the distance calculated thus, via the communication interface 105 to the apparatus in which the distance measuring device 1 is installed, as needed. On the apparatus side, the distance to the object that exists in a range of 360 degrees therearound is acquired on the basis of the received distance data, and predetermined control is executed.

Effects of Embodiment 1

According to Embodiment 1 described above, the following effects are achieved.

Since the lens barrel 36 (adjustment member) is configured such that the tilt angles of the reflecting surfaces 36c and the reflecting surfaces 36d relative to the optical axis 35a are different from each other, as shown in FIG. 5A to FIG. 6C, the position on which the reflected light reflected by the reflecting surfaces 36c is condensed and the position on which the reflected light reflected by the reflecting surfaces 36d is condensed are displaced in a direction parallel to the light receiving surface 38a of the photodetector 38. Therefore, when the distance to an object is changed, the reflected light reflected by the reflecting surfaces 36c and the reflected light reflected by the reflecting surfaces 36d complementarily approach and become separated from the light receiving surface 38a of the photodetector 38. Thus, even when the distance to the object is changed, the reflected light can be guided to the photodetector 38. Accordingly, the distance to the object can be properly measured.

The reflecting surfaces 36c and 36d are provided so as to be alternately aligned in the circumferential direction of the inner surface of the lens barrel 36. Accordingly, the reflected light condensed by the condensing lens 35 can be uniformly incident on the reflecting surfaces 36c and 36d. Thus, even when a part of the reflected light is missing, the other part of the reflected light can be guided to the reflecting surfaces 36c and 36d, and the reflected light can be properly guided to the photodetector 38.

As described with reference to FIG. 5A to FIG. 6C, the condensing lens 35 and the lens barrel 36 are configured such that, when an object exists at the farthest position in the distance measurement range, reflected light is condensed directly on the photodetector 38 without being reflected by any of the reflecting surfaces 36c and 36d. Accordingly, when an object is located at the farthest position in the distance measurement range, weak reflected light can be efficiently guided to the photodetector 38 without being attenuated by the reflecting surfaces 36c and 36d.

As shown in FIG. 2, the light source 31, which emits laser light, is installed so as to be embedded at the center of the condensing lens 35. When the light source 31 is embedded at the center of the condensing lens 35 as described above, since reflected light is blocked by the light source 31, only reflected light incident on an outer peripheral region of the condensing lens 35, of reflected light traveling toward the condensing lens 35, is condensed on the photodetector 38. Therefore, in this configuration, in the case where the lens barrel 36 is not disposed, a region on which reflected light is condensed may deviate from the photodetector 38 depending on whether an object is far or close. On the other hand, in the distance measuring device 1 of Embodiment 1, since the lens barrel 36 is disposed as described above, even when the light source 31 is embedded in the condensing lens 35 as described above, reflected light can be guided to the photodetector 38 regardless of whether an object is far or close.

Modifications of Embodiment 1

The configuration of the distance measuring device 1 can be modified in various ways other than the configuration shown in Embodiment 1 described above.

For example, the numbers of the reflecting surfaces 36c and 36d provided on the inner surface of the lens barrel 36 are not limited to the numbers shown in FIGS. 3A and 3B.

Figure 9C:
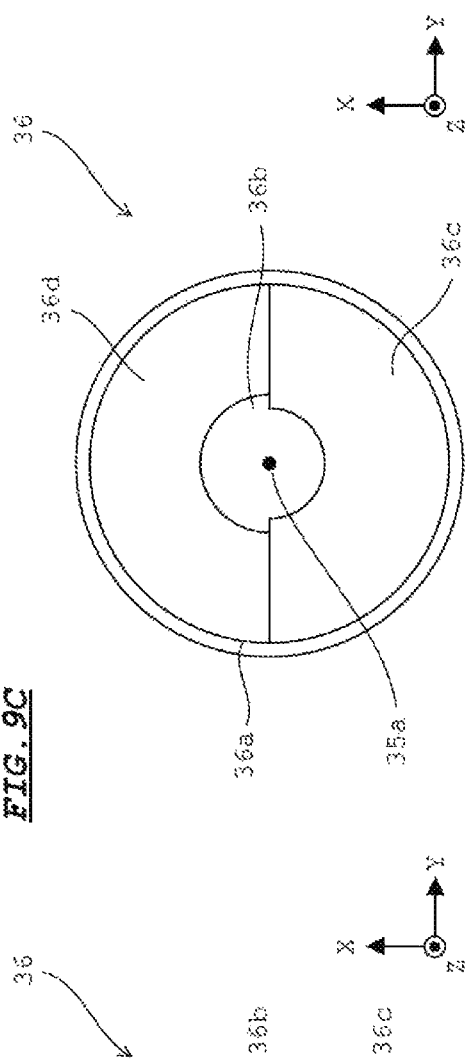
FIG. 9C is a plan view of a lens barrel according to another modification of Embodiment 1 as viewed in a direction parallel to the optical axis of a condensing lens, specifically, as viewed from the reflected light incident side.
Figure 9D:
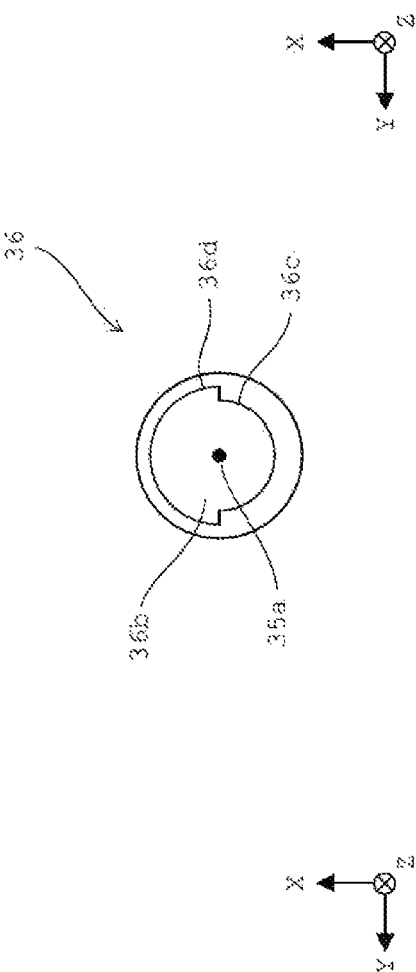
FIG. 9D is a plan view of the lens barrel according to the other modification of Embodiment 1 as viewed in the direction parallel to the optical axis of the condensing lens, specifically, as viewed from the reflected light emission side.
Figure 9A:
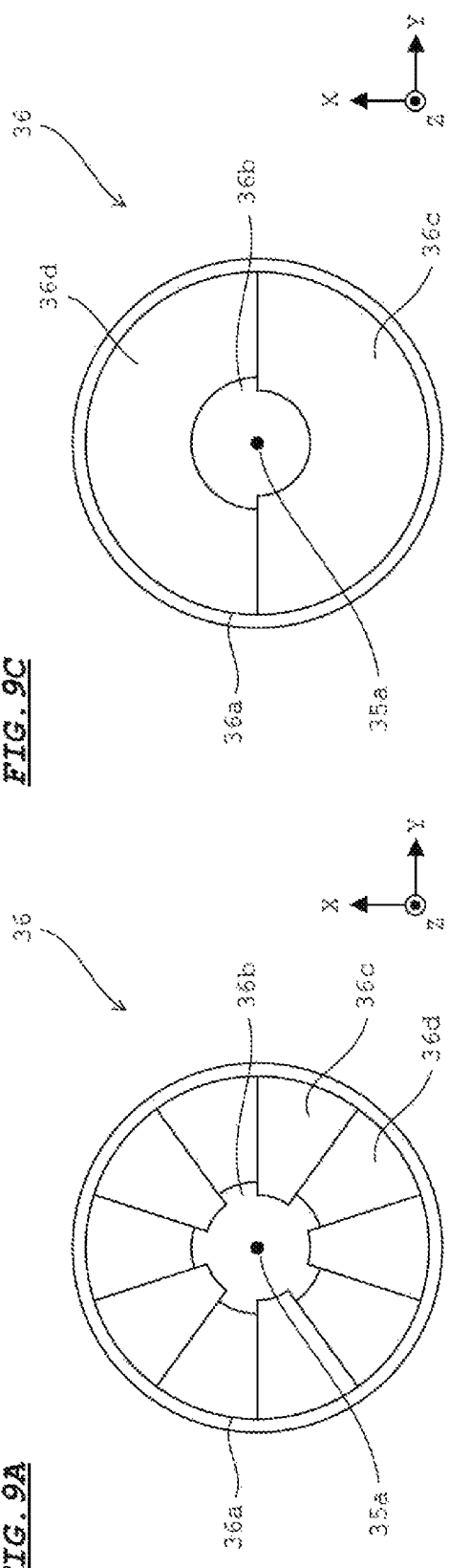
FIG. 9A is a plan view of a lens barrel according to a modification of Embodiment 1 as viewed in a direction parallel to the optical axis of a condensing lens, specifically, as viewed from the reflected light incident side.
Figure 9B:
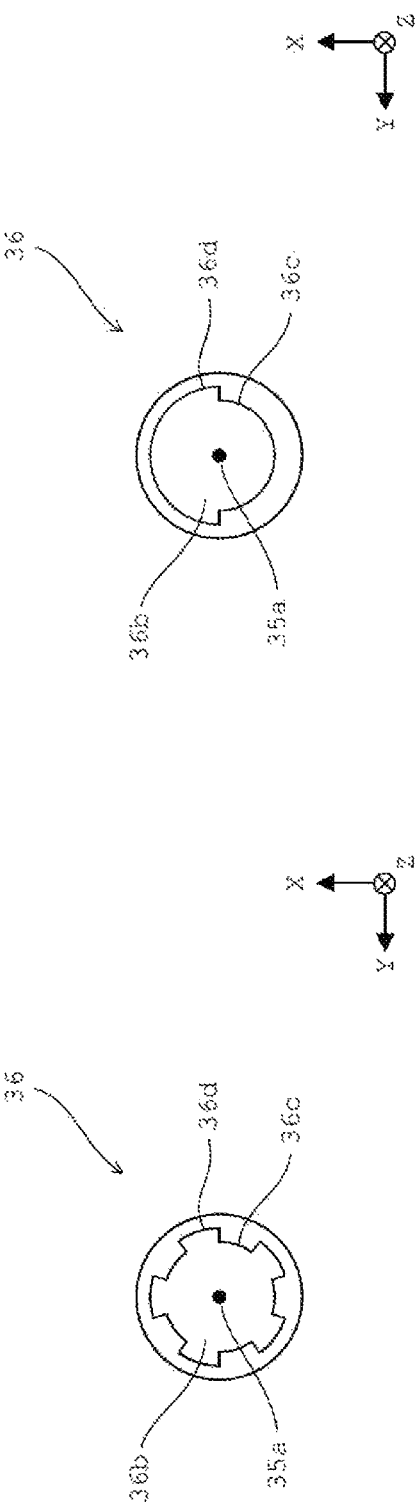
FIG. 9B is a plan view of the lens barrel according to the modification of Embodiment 1 as viewed in the direction parallel to the optical axis of the condensing lens, specifically, as viewed from the reflected light emission side.

FIGS. 9A and 9B are each a plan view of the lens barrel 36 according to a modification as viewed in a direction parallel to the optical axis 35a of the condensing lens 35, and FIGS. 9C and 9D are each a plan view of the lens barrel 36 according to another modification as viewed in the direction parallel to the optical axis 35a of the condensing lens 35.

In the modification shown in FIGS. 9A and 9B, five reflecting surfaces 36c and five reflecting surfaces 36d are alternately provided in the circumferential direction on the inner surface. In the example shown in FIGS. 9C and 9D, one reflecting surface 36c and one reflecting surface 36d are provided in the circumferential direction on the inner surface. Similar to Embodiment 1 described above, the reflecting surfaces 36c and 36d are curved surfaces that coincide with conical surfaces having different apex angles, respectively. As described above, it is sufficient that the number of reflecting surfaces 36c and the number of reflecting surfaces 36d are each 1 or more. When the number of reflecting surfaces 36c and the number of reflecting surfaces 36d are each 1 or more, similar to Embodiment 1 described above, reflected light can be guided to the photodetector 38 even if the distance to an object is changed.

Also in the cases of these modifications, the tilt angles and the widths (areas) of each reflecting surface 36c and each reflecting surface 36d are adjusted such that, in the distance measurement range, reflected light from each reflecting surface 36c and reflected light from each reflecting surface 36d are complementarily and efficiently incident on the light receiving surface 38a of the photodetector 38.

In the modifications shown in FIGS. 9A and 9B and FIGS. 9C and 9D, one reflecting surface 36c and one reflecting surface 36d are provided at positions symmetrical with respect to the optical axis 35a as viewed in the direction of the optical axis 35a (Z-axis direction). That is, in the case of Embodiment 1 described above and shown in FIGS. 3A and 3B, two reflecting surfaces 36c are provided at positions symmetrical with respect to the optical axis 35a, and two reflecting surfaces 36d are provided at positions symmetrical with respect to the optical axis 35a. On the other hand, in the cases of FIGS. 9A and 9B and FIGS. 9C and 9D, the reflecting surfaces 36c and 36d are provided at positions symmetrical with respect to the optical axis 35a.

When the reflecting surfaces 36c and 36d are provided at positions symmetrical with respect to the optical axis 35a as described above, even if the reflected light converged by the condensing lens 35 has an elongated shape on a plane perpendicular to the optical axis 35a, the reflected light can be guided to the reflecting surfaces 36c and 36d in a well-balanced manner. Hereinafter, the effect achieved in this case will be described with reference to FIGS. 10 to 11D.

Figure 10:
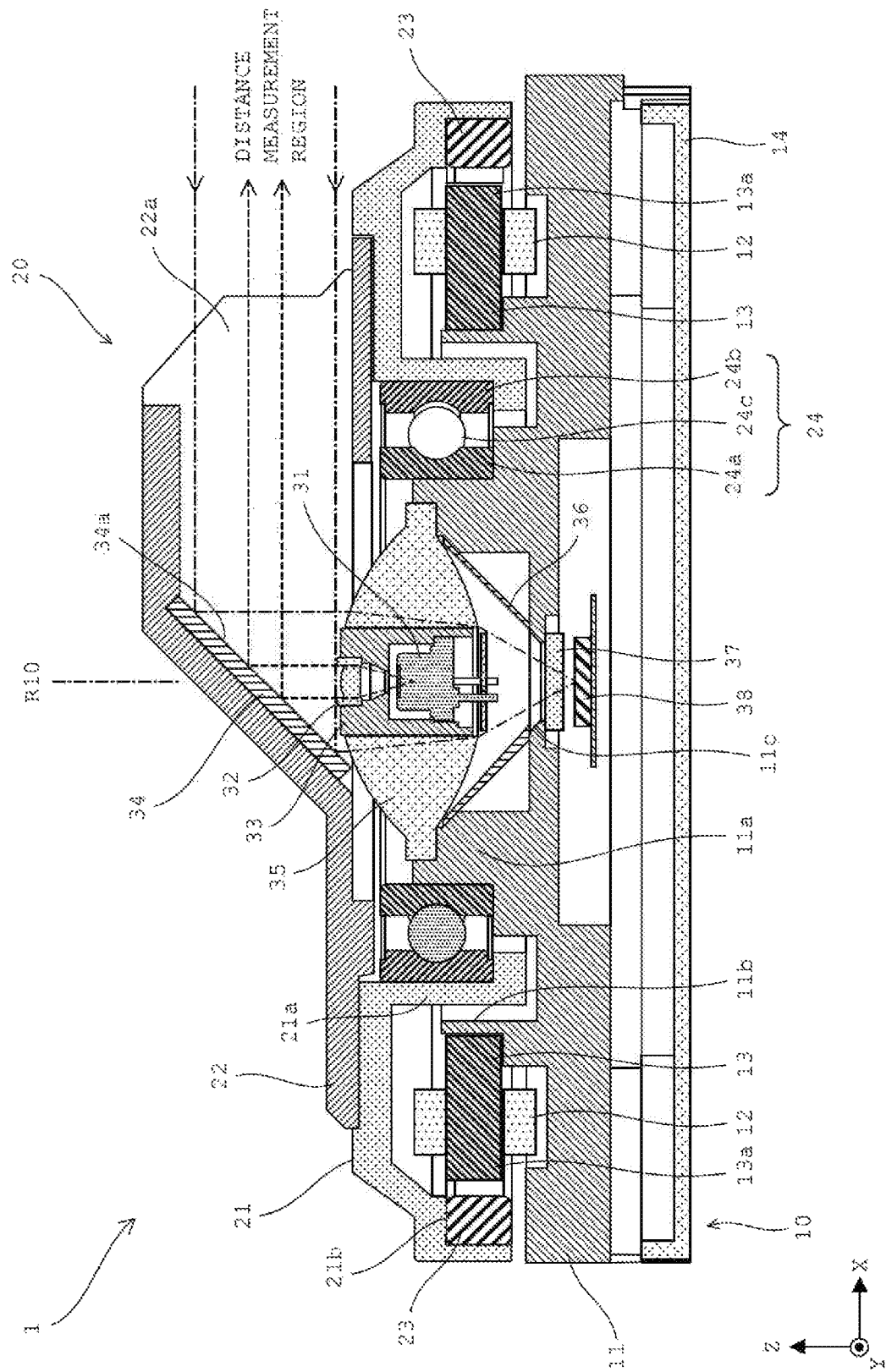
FIG. 10 is a cross-sectional view showing a configuration of a distance measuring device according to a modification of Embodiment 1.

FIG. 10 is a cross-sectional view showing a configuration of the distance measuring device 1 in the case where reflected light is incident on the lens barrel 36 with an elongated shape. In this configuration, the width in the X-axis direction of the mirror 34 is shorter than that in the distance measuring device 1 shown in FIG. 2. Thus, the width in the X-axis direction of the reflected light reflected by the mirror 34 is smaller than that in Embodiment 1 described above.

Figure 11A:
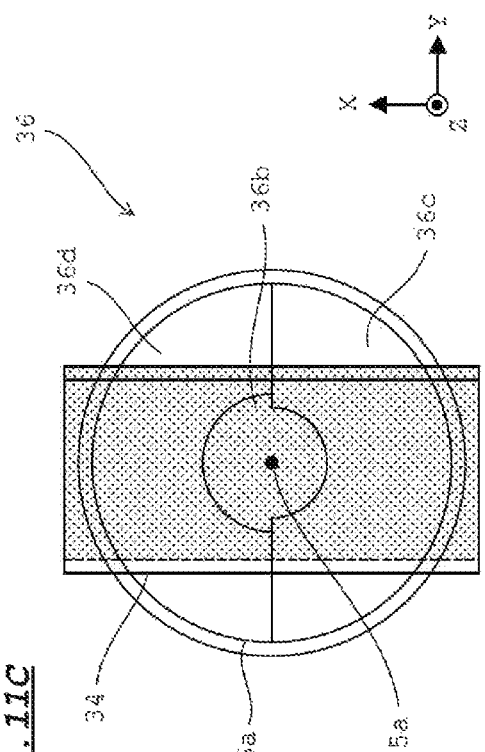
FIGS. 11A and 11B are each a diagram schematically showing a positional relationship between a mirror and a lens barrel according to a modification of Embodiment 1.
Figure 11C:
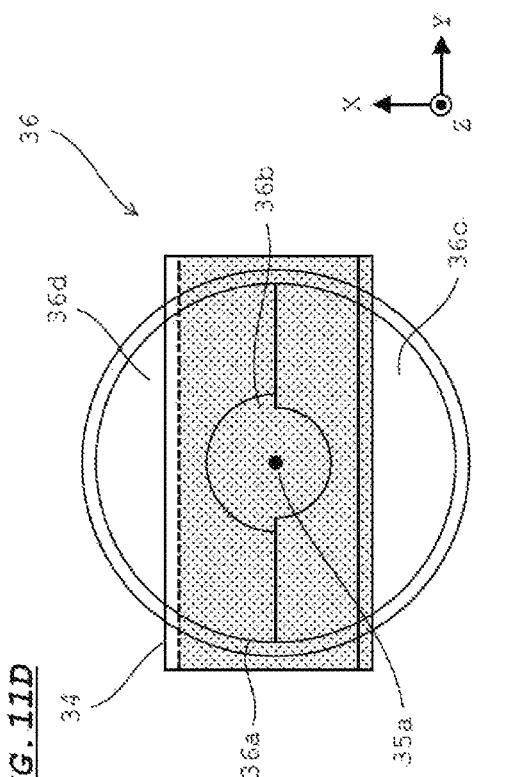
FIGS. 11C and 11D are each a diagram schematically showing a positional relationship between a mirror and a lens barrel according to another modification of Embodiment 1.
Figure 11B:
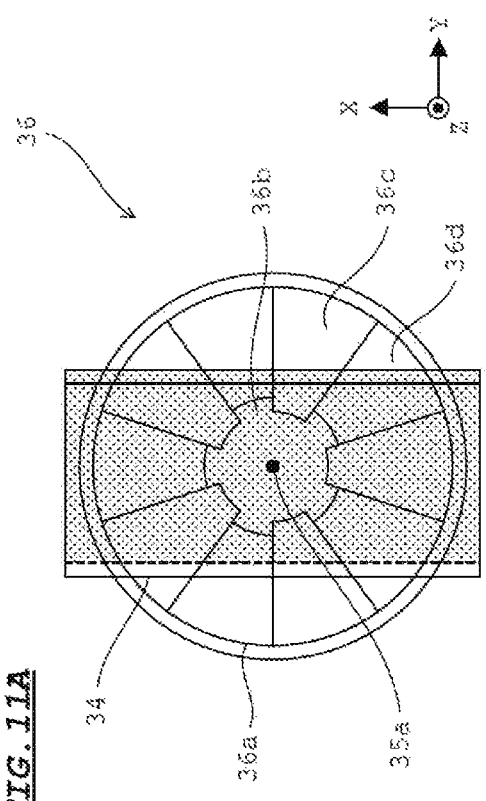

FIGS. 11A and 11B are each a diagram schematically showing a positional relationship between the mirror 34 and the lens barrel 36 in the case where the lens barrel 36 in FIGS. 9A and 9B is used in the distance measuring device 1 shown in FIG. 10.

As shown in FIG. 11A in the case where the longitudinal direction of the mirror 34 is parallel to the X axis, the reflected light reflected in the Z-axis negative direction by the mirror 34 has an elongated shape in which the width in the Y-axis direction is short and the width in the X-axis direction is wide. In this case, since the reflecting surfaces 36c and 36d are provided at positions symmetrical with respect to the optical axis 35a in the lens barrel 36 in FIGS. 9A and 9B, even when reflected light is incident on the lens barrel 36 with an elongated shape as described above, the reflected light is substantially uniformly incident on both of the reflecting surfaces 36c and 36d in a well-balanced manner. In addition, in the case where the mirror 34 is rotated by 90° from the state of FIG. 11A as shown in FIG. 11B, the reflected light reflected by the mirror 34 has a shape elongated in the Y-axis direction. In this case as well, since the reflecting surfaces 36c and 36d are provided at positions symmetrical with respect to the optical axis 35a, the reflected light is substantially uniformly incident on both of the reflecting surfaces 36c and 36d in a well-balanced manner.

Figure 11D:
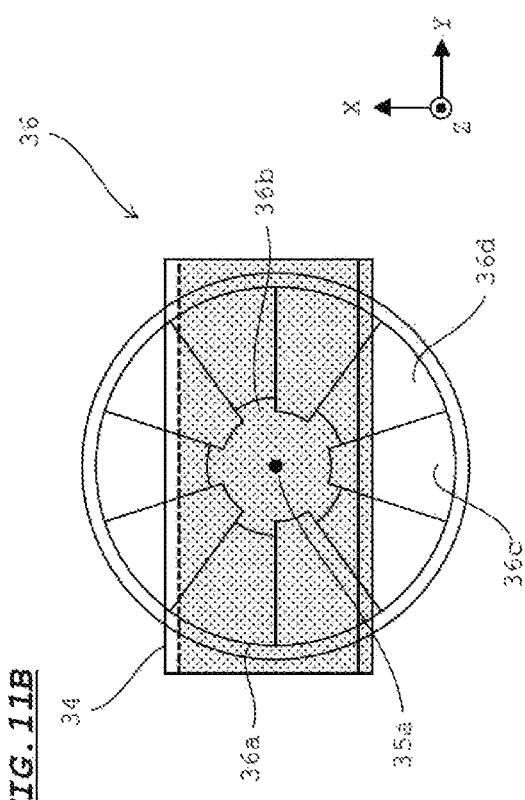

FIGS. 11C and 11D are each a diagram schematically showing a positional relationship between the mirror 34 and the lens barrel 36 in the case where the lens barrel 36 in FIGS. 9C and 9D is used in the distance measuring device 1 shown in FIG. 10. In this case as well, since the reflecting surfaces 36c and 36d are provided at positions symmetrical with respect to the optical axis 35a as shown in FIG. 11C, even when reflected light is incident on the lens barrel 36 with an elongated shape, the reflected light is substantially uniformly incident on both of the reflecting surfaces 36c and 36d in a well-balanced manner. Similarly, even in the case where the mirror 34 is rotated by 90° from the state of FIG. 11C as shown in FIG. 11D, the reflected light is substantially uniformly incident on both of the reflecting surfaces 36c and 36d in a well-balanced manner.

Therefore, when the reflecting surfaces 36c and 36d are provided at positions symmetrical with respect to the optical axis 35a, reflected light reflected by the mirror 34 and having an elongated shape is substantially uniformly incident on both of the reflecting surfaces 36c and 36d in a well-balanced manner. Accordingly, the actions of both the reflecting surfaces 36c and the reflecting surfaces 36d can be applied to the reflected light in a well-balanced manner. Thus, regardless of the distance to an object, reflected light can be guided to the photodetector 38 to a similar extent, and the distance to the object can be properly acquired.

With the configuration of FIG. 10, the amount of reflected light guided to the photodetector 38 is decreased as compared to the configuration of Embodiment 1 shown in FIG. 2, but the height of the distance measuring device 1 can be reduced.

Moreover, the reflecting surfaces 36c and 36d are curved surfaces along the circumferential direction on the inner surface of the lens barrel 36, but the shapes of the reflecting surfaces 36c and 36d are not limited thereto, and the reflecting surfaces 36c and 36d may be, for example, flat surfaces. Also in the case where the reflecting surfaces 36c and 36d are flat surfaces, the tilt angles and the widths (areas) of the reflecting surfaces 36c and the reflecting surfaces 36d are adjusted such that, in the distance measurement range, reflected light from the reflecting surfaces 36c and reflected light from the reflecting surfaces 36d are complementarily and efficiently incident on the light receiving surface 38a of the photodetector 38.

In the case where the reflecting surfaces 36c and 36d are flat surfaces, reflected light reflected by the reflecting surfaces 36c and 36d is less likely to be converged as compared to the case where the reflecting surfaces 36c and 36d are curved surfaces that coincide with conical surfaces as in Embodiment 1 and the modifications described above. Thus, to more efficiently guide reflected light to the light receiving surface 38a of the photodetector 38, it is preferable that the reflecting surfaces 36c and 36d are curved surfaces as in Embodiment 1 and the modifications described above.

The number of types of tilt angles of reflecting surfaces provided on the inner surface of the lens barrel 36 is not limited to two. For example, a third reflecting surface having a different tilt angle may further be provided to the adjustment member. In this case as well, the tilt angles and the widths (areas) of the three types of reflecting surfaces are adjusted such that, in the distance measurement range, reflected light from the three types of reflecting surfaces is complementarily and efficiently incident on the light receiving surface 38a of the photodetector 38.

The plurality of reflecting surfaces 36c provided to the lens barrel 36 do not have to all have the same width in the circumferential direction. Similarly, the plurality of reflecting surfaces 36d provided to the lens barrel 36 do not have to all have the same width in the circumferential direction.

In Embodiment 1 described above, the light source 31 and the collimator lens 32 are installed in the condensing lens 35. However, the light source 31 and the collimator lens 32 may be disposed at a position separate from the condensing lens 35.

Figure 12B:
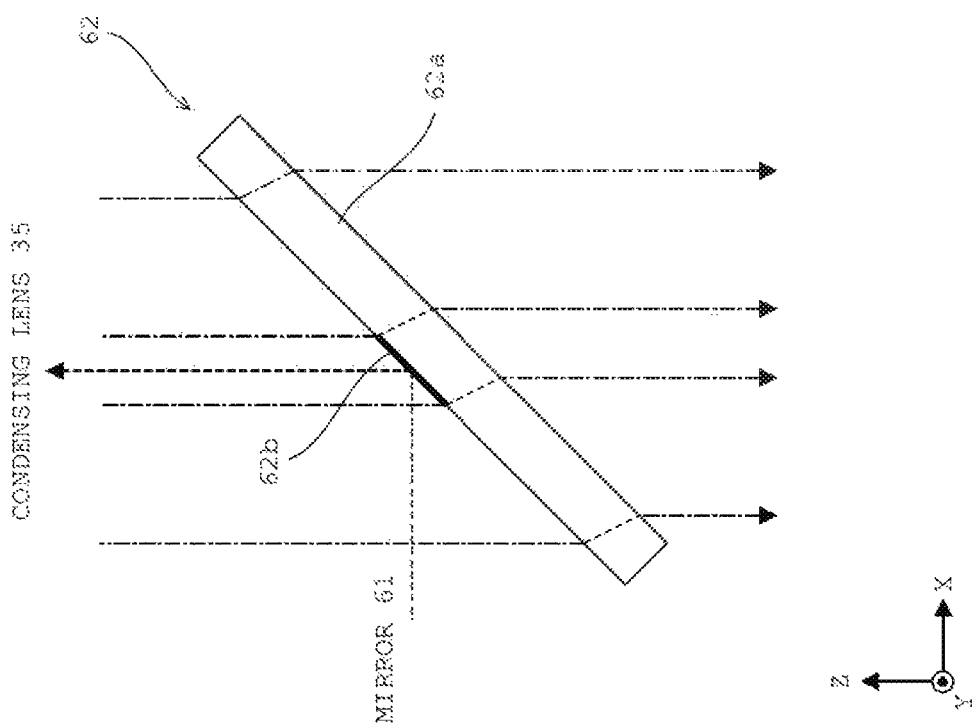
FIG. 12B is an enlarged side view of a mirror according to the modification in which the light source and the collimator lens are disposed at a different position.
Figure 12A:
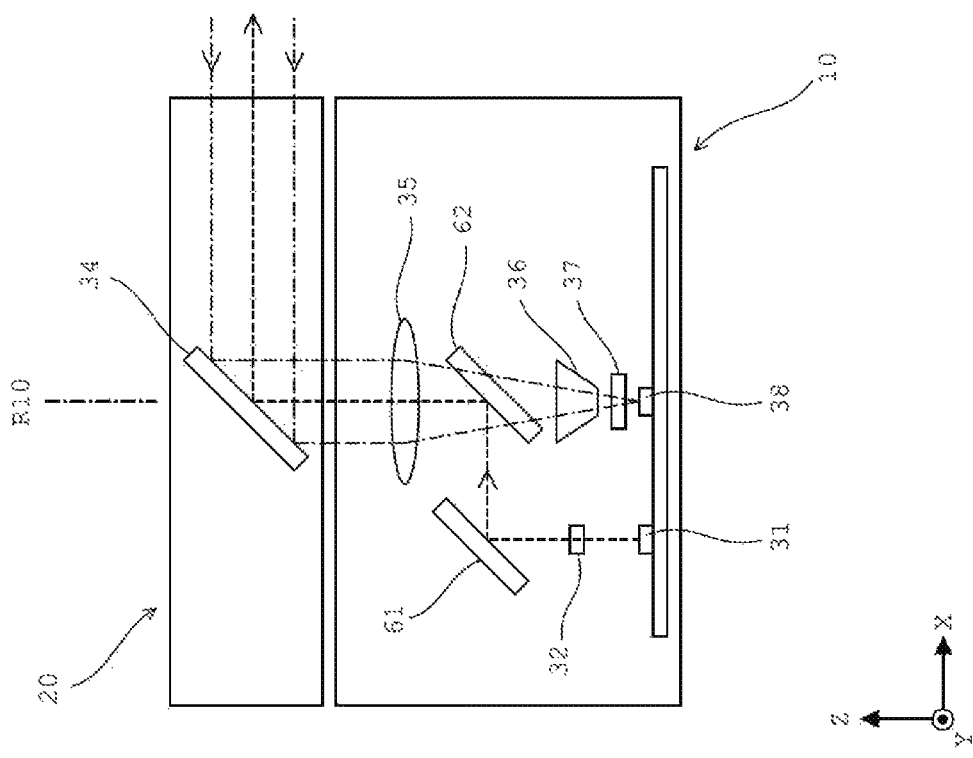
FIG. 12A is a side perspective view schematically showing a configuration of a distance measuring device according to a modification in which a light source and a collimator lens are disposed at a different position.

FIGS. 12A and 12B are each a diagram showing a configuration in the case where the light source 31 and the collimator lens 32 are disposed on the X-axis negative side of the rotation center axis R10. FIG. 12A is a side perspective view schematically showing a configuration of the distance measuring device 1 according to this modification, and FIG. 12B is an enlarged side view of a mirror 62 according to this modification.

As shown in FIG. 12A, in this modification, the light source 31 and the photodetector 38 are installed on a board so as to be aligned in the X-axis direction. In addition, mirrors 61 and 62 are installed on the fixing part 10 on the Z-axis negative side of the condensing lens 35. The collimator lens 32 is installed between the light source 31 and the mirror 61. The condensing lens 35 condenses reflected light over the entire region thereof. The mirror 61 is a total reflection mirror. As shown in FIG. 12B, the mirror 62 includes a transparent member 62a and a reflection film 62b. The reflection film 62b is provided at the center of the surface on the Z-axis positive side of the transparent member 62a. A reflection film is not formed in a region other than the reflection film 62b.

In this modification, the laser light emitted from the light source 31 is converted into parallel light by the collimator lens 32 and reflected in the X-axis positive direction by the mirror 61. The laser light reflected by the mirror 61 is incident on the reflection film 62b. Thereafter, the laser light is reflected in the Z-axis positive direction by the reflection film 62b, travels through the condensing lens 35, and is reflected to the distance measurement region by the mirror 34. The reflected light from an object in the distance measurement region is reflected in the Z-axis negative direction by the mirror 34 and condensed by the condensing lens 35. Most of the reflected light condensed by the condensing lens 35 passes through the transparent member 62a of the mirror 62. Similar to the above embodiment, the reflected light having passed through the mirror 62 is guided through the lens barrel 36 and the filter 37 to the photodetector 38.

In this modification as well, similar to the above embodiment, since the lens barrel 36 is provided, even when the distance to an object is short, reflected light can be guided to the photodetector 38 by at least either of the reflecting surfaces 36c and 36d in accordance with the distance to the object.

The light source 31 and the collimator lens 32 may be disposed on the rotary part 20 side. However, in this case, a configuration for supplying power from the fixing part 10 side to the rotary part 20 side is needed. Thus, it can be said that, in order to stably drive the light source 31 with a simple configuration, it is preferable to dispose the light source 31 on the fixing part 10 side as in the above embodiment.

The structure according to the present invention can also be applied to a device that does not have a distance measurement function and has only a function of detecting whether or not an object exists in the projection direction, on the basis of a signal from the photodetector 38. In this case as well, even when the distance to an object is short, reflected light can be guided to the photodetector 38 by at least either of the reflecting surfaces 36c and 36d in accordance with the distance to the object. Thus, the presence/absence of an object can be properly detected.

Embodiment 2

In Embodiment 1 described above, the reflecting surfaces 36c and 36d are provided at the same position in the optical axis direction (Z-axis direction). However, in Embodiment 2, two types of reflecting surfaces for guiding reflected light to the photodetector 38 are provided at positions different from each other in the optical axis direction of the condensing lens 35 (Z-axis direction).

Figure 13:
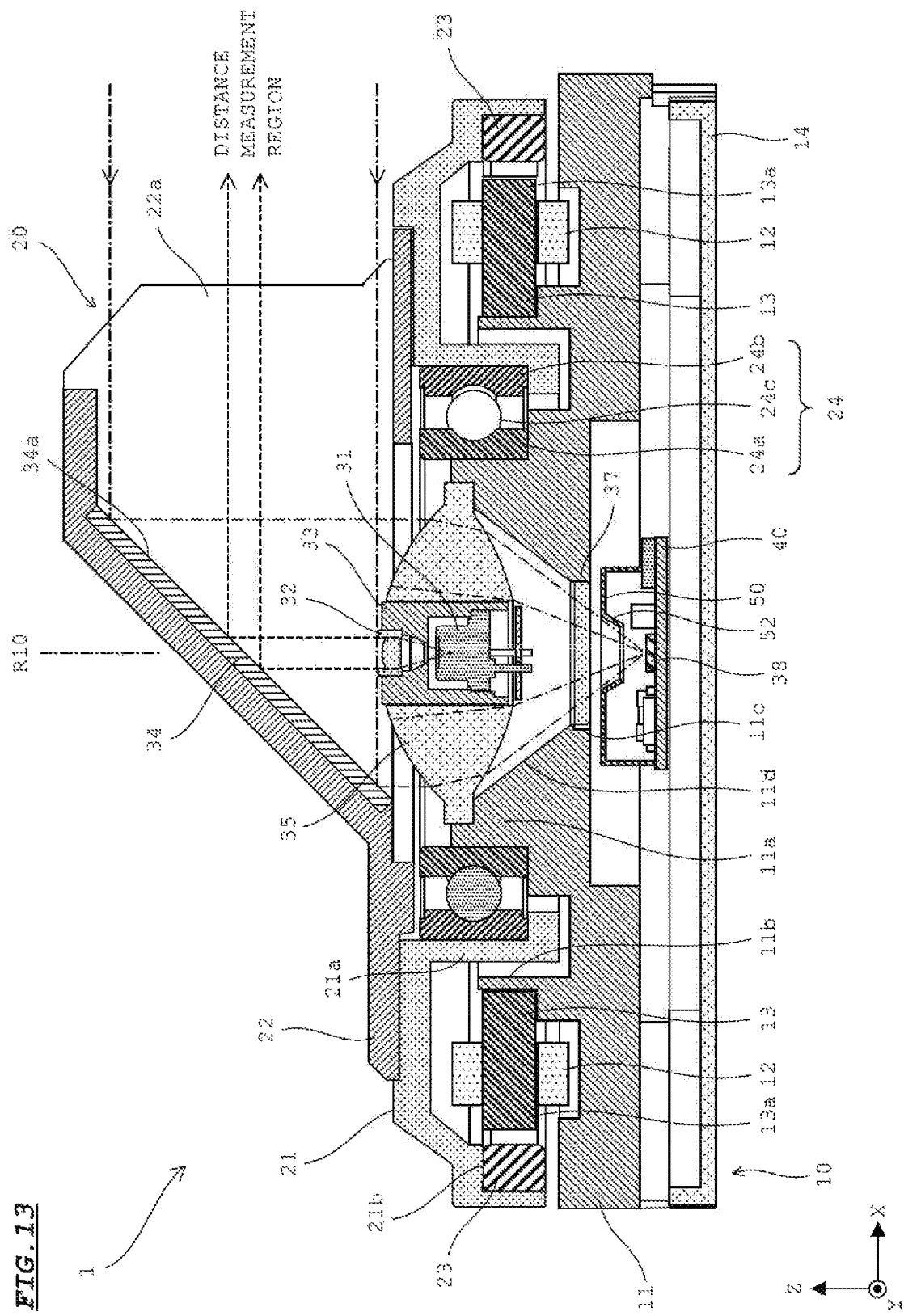
FIG. 13 is a cross-sectional view showing a configuration of a distance measuring device according to Embodiment 2.

FIG. 13 is a cross-sectional view showing a configuration of the distance measuring device 1 according to Embodiment 2. In FIG. 13, the same parts as those in FIG. 2 are denoted by the same reference characters.

In Embodiment 2, a tubular reflecting surface 11d (first reflecting surface) is formed in the support base 11. The reflecting surface 11d coincides with a predetermined conical surface. The central axis of the reflecting surface 11d coincides with the optical axis of the condensing lens 35. The circular hole 11c is connected to the lower end of the reflecting surface 11d.

Similar to Embodiment 1, the support base 11 is molded from, for example, a resin such as polycarbonate. Accordingly, the reflecting surface 11d reflects light with a predetermined reflectance. After the support base 11 is molded, the reflecting surface 11d may be formed by providing a reflection film on a portion corresponding to the reflecting surface 11d, or by performing mirror finish on the portion corresponding to the reflecting surface 11d. By forming the support base 11 from a metal such as aluminum, glass, or the like, the reflecting surface 11d may be formed so as to reflect light.

The reflecting surface 11d is integrally formed in the support base 11. However, the reflecting surface 11d may be provided by disposing a lens barrel in the support base 11, similar to Embodiment 1.

In Embodiment 2, a shield cover 50 is further installed on the upper surface of a board 40 on which the photodetector 38 is installed.

Figure 14:
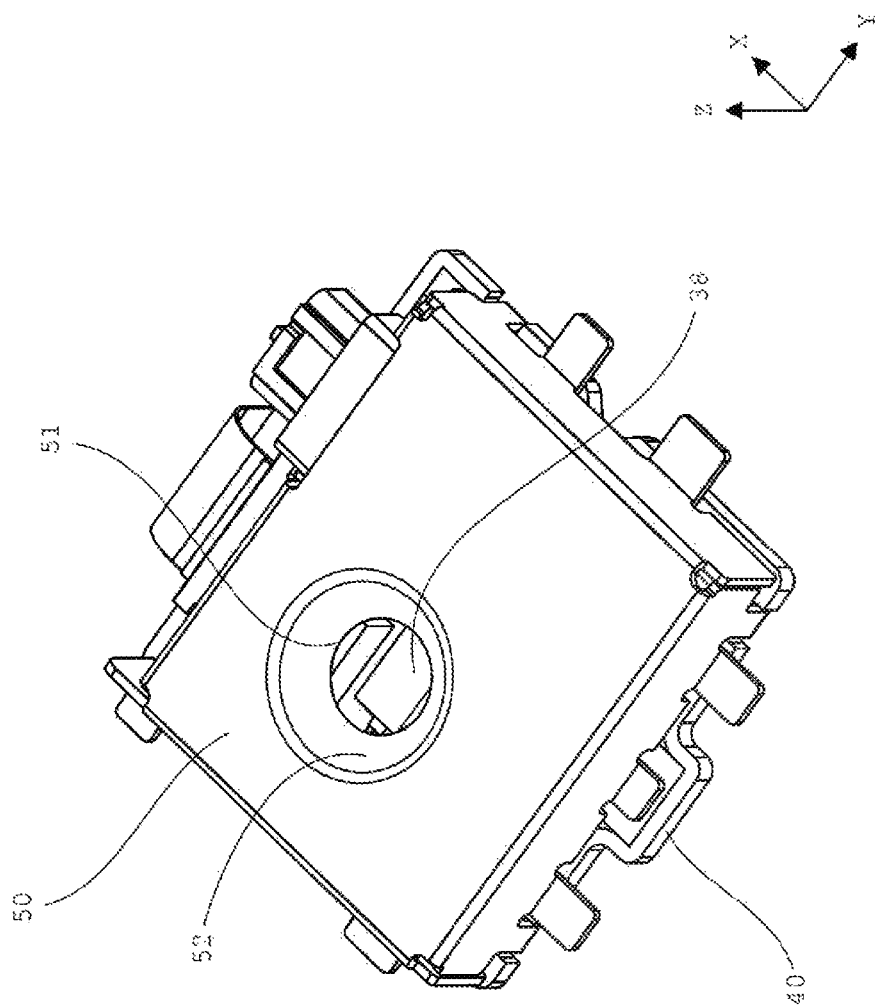
FIG. 14 is a perspective view showing a configuration when a board and a shield cover according to Embodiment 2 are viewed from the upper surface side.

FIG. 14 is a perspective view showing a configuration when the board 40 and the shield cover 50 are viewed from the upper surface side (Z-axis positive side).

In addition to the photodetector 38, an amplifier circuit that amplifies a signal from the photodetector 38, etc., are disposed on the board 40. The shield cover 50 is installed on the upper surface of the board 40 so as to cover the photodetector 38 and various circuits on the board 40. The shield cover 50 is formed from a conductive metal such as copper, iron, and aluminum, and is electrically connected to ground or the like with solder or the like. The shield cover 50 is a cover for electromagnetically shielding a light receiving unit including the photodetector 38 and various circuits on the board 40. By covering the upper part of the light receiving unit with the shield cover 50, noise generated in the photodetector 38 due to electromagnetic waves can be suppressed.

The shield cover 50 has a rectangular parallelepiped shape. A hole 51 is formed in the upper surface of the shield cover 50 so as to vertically penetrate the shield cover 50. A tubular reflecting surface 52 (second reflecting surface) is formed around the hole 51. The lower end of the reflecting surface is connected to the hole 51. The reflecting surface 52 coincides with a predetermined conical surface. The central axis of the reflecting surface 52 coincides with the optical axis of the condensing lens 35.

Since the shield cover 50 is molded from a metal, the reflecting surface 52 reflects light with a relatively high reflectance. After the shield cover 50 is molded, the reflecting surface 52 may be formed by providing a reflection film on a portion corresponding to the reflecting surface 52, or by performing mirror finish on the portion corresponding to the reflecting surface 52.

Referring back to FIG. 13, the reflecting surface 11d and the reflecting surface 52 are provided so as to be aligned along the optical axis 35a of the condensing lens 35. The central axis of the reflecting surface 11d and the central axis of the reflecting surface 52 coincide with the rotation center axis R10. The reflecting surface 52 is disposed at the stage subsequent to the reflecting surface 11d. The tilt angle of the reflecting surface 11d relative to the rotation center axis R10 is larger than the tilt angle of the reflecting surface 52 relative to the rotation center axis R10.

Next, the actions of the two reflecting surfaces 11d and 52 will be described with reference to FIG. 15A to FIG. 17C. FIG. 15A to FIG. 17C show simulation results obtained by the inventor performing simulation of rays of reflected light.

FIG. 15A to FIG. 17C are each a side view when a cross-sectional surface obtained by cutting the optical system near the photodetector 38 along a plane passing through the optical axis 35a of the condensing lens 35 is viewed from the side. In FIG. 15A to FIG. 17C, a flux of reflected light incident on the condensing lens 35 is schematically shown.

Figure 15A:
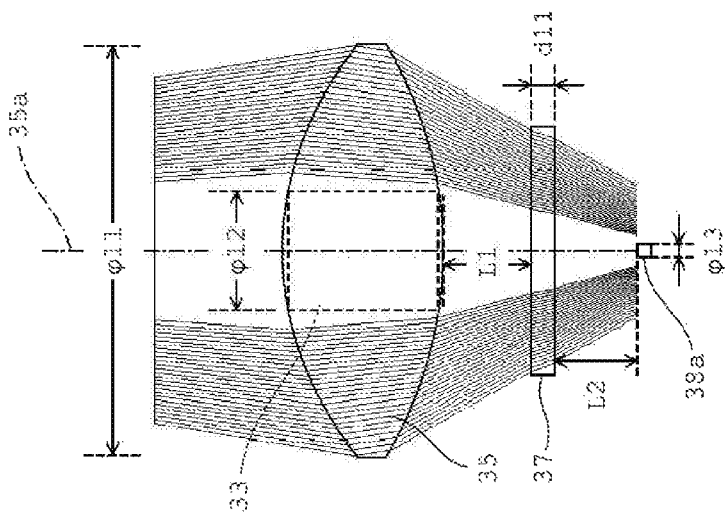
FIGS. 15A to 15C each show simulation results obtained by performing simulation of rays of reflected light according to Comparative Example 4 in Embodiment 2.
Figure 15B:
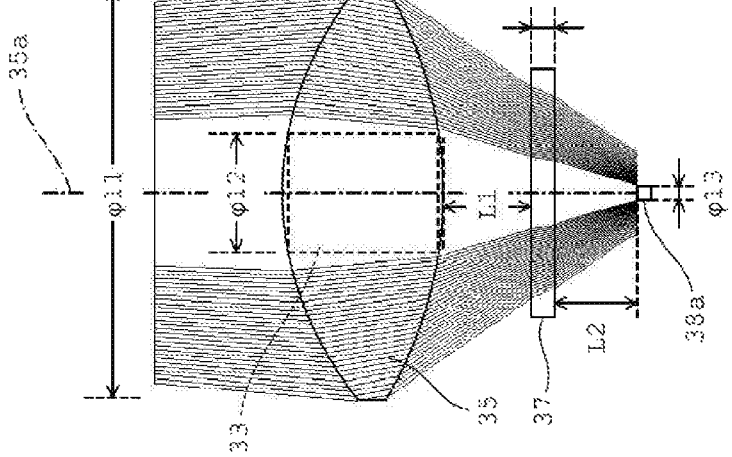
Figure 15C:
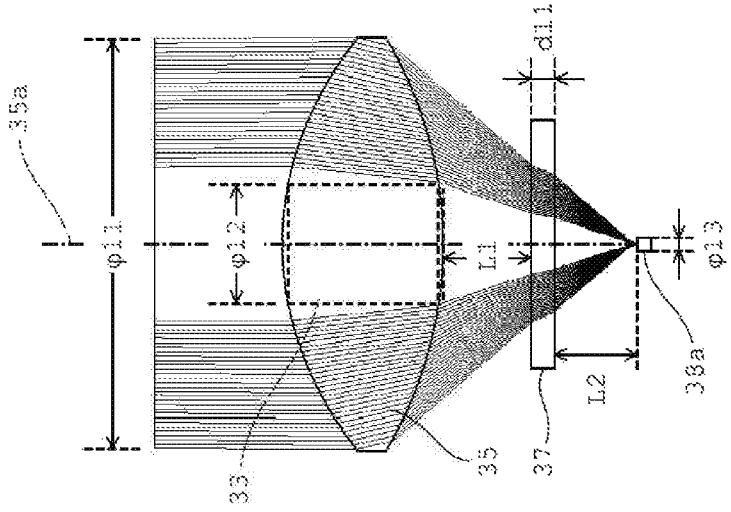
Figure 16A:
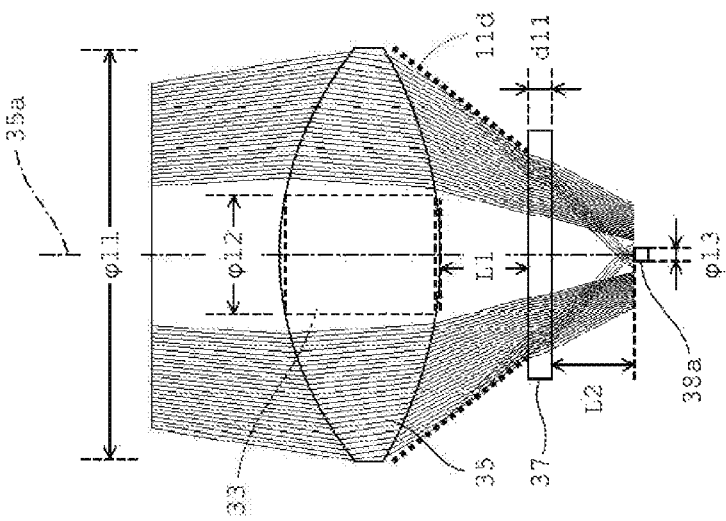
FIGS. 16A to 16C each show simulation results obtained by performing simulation of rays of reflected light according to Comparative Example 5 in Embodiment 2.
Figure 16B:
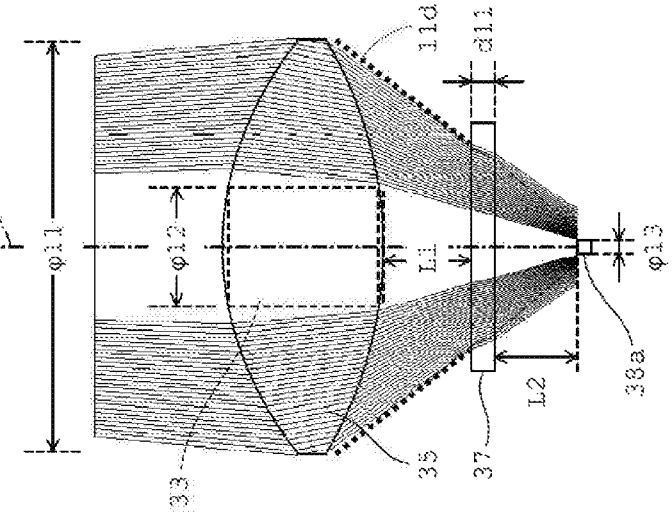
Figure 16C:
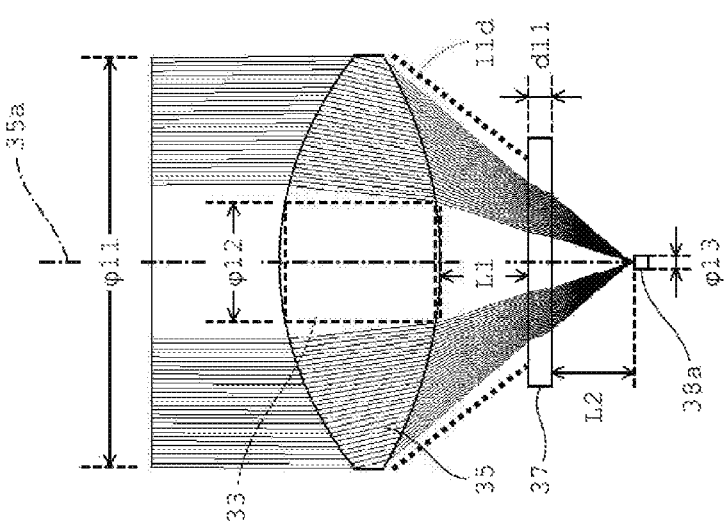
Figure 17A:
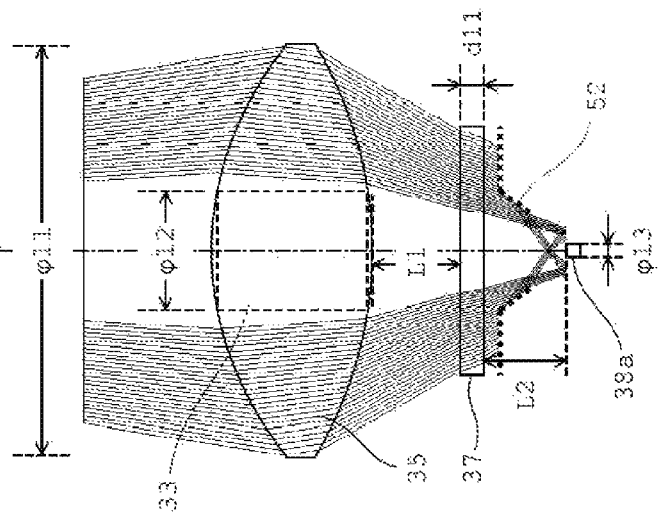
FIGS. 17A to 17C each show simulation results obtained by performing simulation of rays of reflected light according to Comparative Example 6 in Embodiment 2.
Figure 17B:
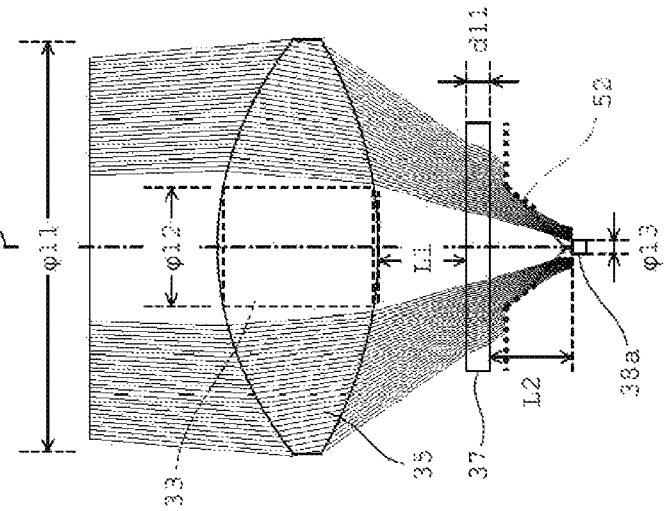
Figure 17C:
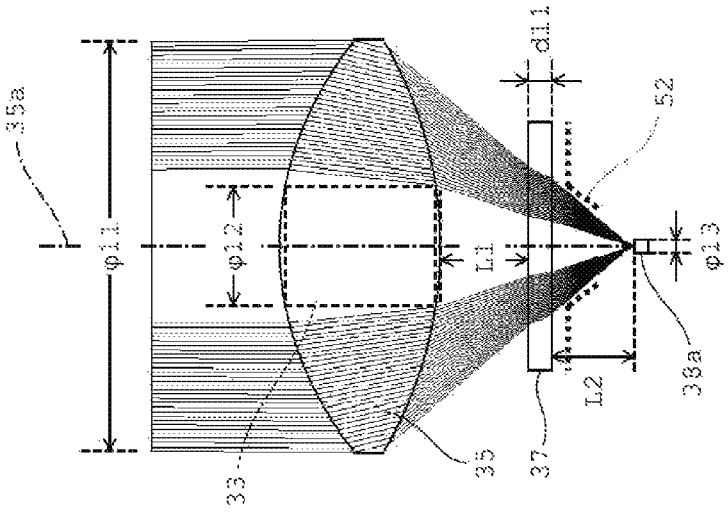

FIGS. 15A to 15C are each a ray diagram obtained in the case where the reflecting surfaces 11d and 52 are not provided (Comparative Example 4), FIGS. 16A to 16C are each a ray diagram obtained in the case where the reflecting surface 11d is provided and the reflecting surface 52 is not provided (Comparative Example 5), and FIGS. 17A to 17C are each a ray diagram obtained in the case where the reflecting surface 11d is not provided and the reflecting surface 52 is provided (Comparative Example 6).

The conditions for this simulation are set as follows.
Effective diameter φ11 of condensing lens 35: 19.0 mm
Diameter φ12 of holder 33: 6.5 mm
Diameter φ13 of light receiving surface 38a of photodetector 38: 0.2 mm
Internal diffuse reflectance of reflecting surfaces 11d and 52: 10%
Thickness d1 of filter 37: 1.1 mm
Angle θ1 formed between optical axis 35a and reflecting surface 11d: 37.6°
Angle θ2 formed between optical axis 35a and reflecting surface 52: 35.0°
Focal distance of condensing lens 35: about 15 mm
Refractive index of condensing lens 35: 1.573
Refractive index of filter 37: 1.511
Wavelength of light: 845 nm
Distance L1 between condensing lens 35 and filter 37: 4.3 mm
Distance L2 between filter 37 and photodetector 38: 3.75 mm Under the conditions, the inventor has performed simulation of rays with the distance to an object to be measured for distance, being changed to 2000 mm, 100 mm, and 50 mm. In this simulation, the optical system is set such that, when the distance to the object is 2000 mm (maximum), light from a point light source (object) on the optical axis 35a of the condensing lens 35 is converged on the photodetector 38 without being substantially reflected by the reflecting surfaces 11d and 52.

When the distance to the object is 2000 mm, as shown in FIG. 15A, FIG. 16A, and FIG. 17A, in any of Comparative Examples 4 to 6, the reflected light condensed by the condensing lens 35 is converged on the light receiving surface 38a without being reflected by the reflecting surfaces 11d and 52.

When the distance to the object is 100 mm, as shown in FIG. 15B, in the case where the reflecting surfaces 11d and 52 are not provided (Comparative Example 4), rays of reflected light are not substantially incident on the light receiving surface 38a. In addition, as shown in FIG. 16B, in the case where only the reflecting surface 11d is provided (Comparative Example 5), a part of rays of reflected light is reflected by the reflecting surface 11d, but the reflected light is not substantially incident on the light receiving surface 38a. On the other hand, as shown in FIG. 17B, in the case where only the reflecting surface 52 is provided (Comparative Example 6), a part of rays of reflected light is incident on the reflecting surface 52, reflected by the reflecting surface 52, and guided to the light receiving surface 38a.

When the distance to the object is 50 mm, as shown in FIG. 15C, in the case where the reflecting surfaces 11d and 52 are not provided (Comparative Example 4), rays of reflected light are further not substantially incident on the light receiving surface 38a. In addition, as shown in FIG. 17C, in the case where only the reflecting surface 52 is provided (Comparative Example 6), a part of rays of reflected light is reflected by the reflecting surface 52, but the reflected light is not substantially incident on the light receiving surface 38a. On the other hand, as shown in FIG. 16C, in the case where only the reflecting surface 11d is provided (Comparative Example 5), a part of rays of reflected light is incident on the reflecting surface 11d, reflected by the reflecting surface 11d, and guided to the light receiving surface 38a.

From the above simulation results regarding rays, it is found that, even when the distance to the object is shorter than 2000 mm, under the above-described conditions, at least a part of reflected light is guided to the light receiving surface 38a by either of the reflecting surfaces 11d and 52.

The optical system of the distance measuring device 1 shown in FIG. 13 is configured such that, as shown in FIG. 16A to FIG. 17C, at least a part of reflected light is guided to the light receiving surface 38a of the photodetector 38. That is, the tilt angles, the widths in a direction parallel to the rotation center axis R10, and the widths (areas) in a direction perpendicular to the rotation center axis R10, of the reflecting surface 11d and the reflecting surface 52 are adjusted such that, in a distance measurement range, reflected light from the reflecting surface 11d and reflected light from the reflecting surface 52 are complementarily and efficiently incident on the light receiving surface 38a of the photodetector 38. Accordingly, in the distance measuring device 1, at least a part of reflected light can be guided to the light receiving surface 38a of the photodetector 38 even when the distance to an object is changed.

Figure 18:
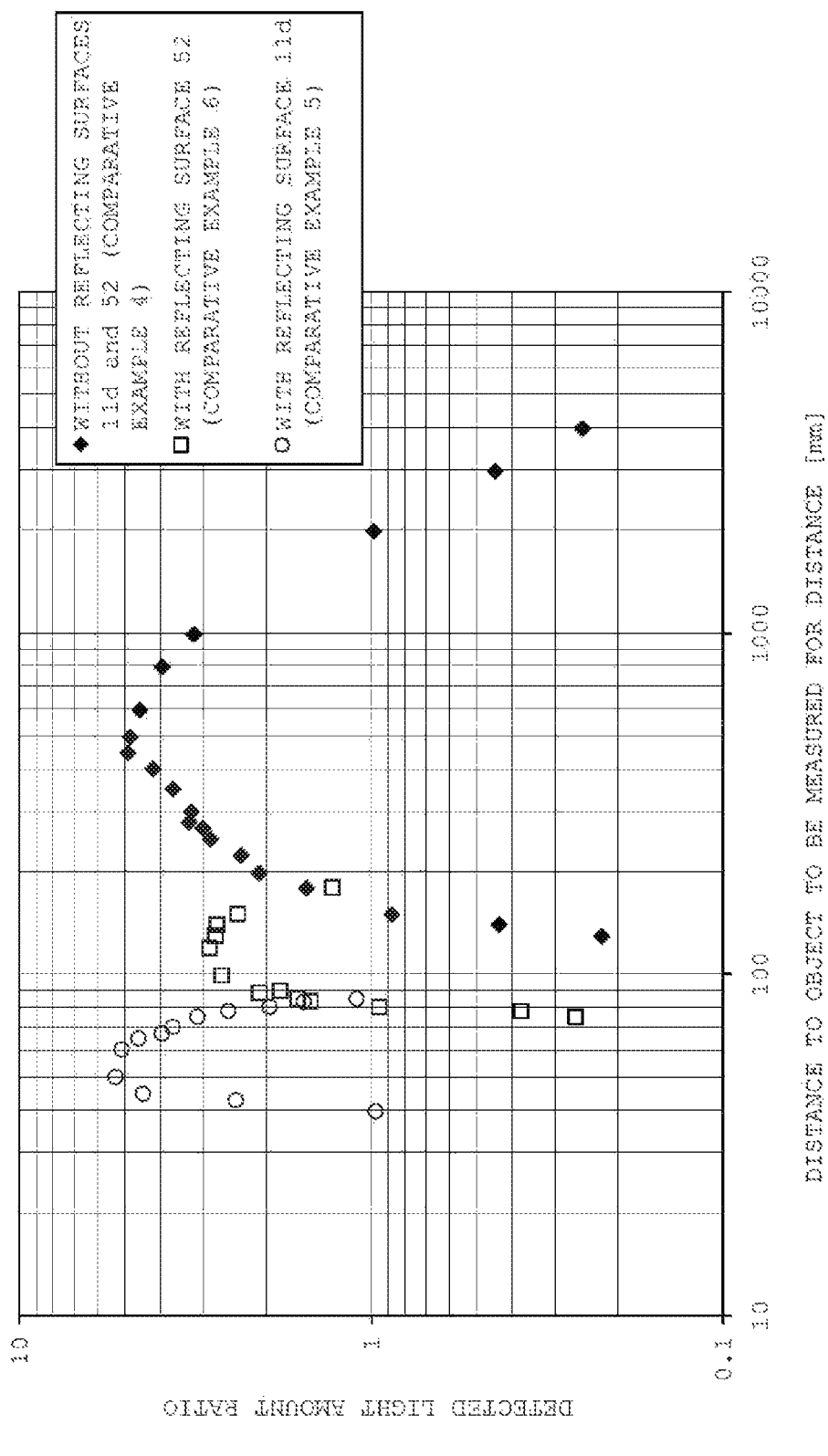
FIG. 18 is a graph showing simulation results according to Comparative Examples 4 to 6.

FIG. 18 is a graph showing simulation results (change of a detected light amount ratio) of Comparative Examples 4 to 6. The detected light amount ratio is the ratio of the amount of light received by the photodetector 38 to the maximum light amount. The horizontal axis indicates the distance (mm) to an object to be measured for distance, and the vertical axis indicates the detected light amount ratio in the case where the detected light amount is defined as 1 when the distance is 2000 mm. Also in this simulation, the angle θ1 formed between the optical axis 35a and the reflecting surface 11d is set to 37.6° (Comparative Example 5), and the angle θ2 formed between the optical axis 35a and the reflecting surface 52 is set to 35.0° (Comparative Example 6). The other conditions are set to be the same as those for the above verification.

In the case of Comparative Example 4 (the case where the reflecting surfaces 11d and 52 are not provided), the amount of detected light rapidly decreases when the distance to the object is shorter than 150 mm. Meanwhile, in the case of Comparative Example 6 (the case where only the reflecting surface 52 is formed), even if the distance to the object is short, the amount of detected light is maintained at a high level when the distance to the object is 80 mm to 150 mm. However, in the case of Comparative Example 6, the amount of detected light rapidly decreases when the distance to the object is shorter than 80 mm. In the case of Comparative Example 5 (the case where only the reflecting surface 11d is formed), the amount of detected light is maintained at a high level when the distance to the object is 40 to 80 mm. However, in the case of Comparative Example 5, the amount of detected light rapidly decreases when the distance to the object is longer than 80 mm.

From the results, it is found that, in the case where the reflecting surfaces 11d and 52 are not provided, reflected light cannot be properly received when the distance to an object is short. In addition, it is found that, with the reflecting surface 52, reflected light can be properly received when the distance is 80 mm to 150 mm, and, with the reflecting surface 11d, reflected light can be properly received when the distance is 80 mm or less. Therefore, it is found that, when the reflecting surface 11d is provided to the support base 11 and the reflecting surface 52 is provided to the shield cover 50 as in Embodiment 2, even if the distance to an object is short, a decrease in the amount of detected light is inhibited, the amount of detected light can be maintained at a high level, and reflected light can be properly received in the entire range for distance measurement.

Effects of Embodiment 2

According to Embodiment 2 described above, the following effects are achieved.

Since the reflecting surface 11d and the reflecting surface 52 are provided as shown in FIG. 13, it is possible to guide at least a part of reflected light to the light receiving surface 38a of the photodetector 38. That is, the tilt angles, the diameters, the positions in the Z-axis direction, etc., of the reflecting surface 11d and the reflecting surface 52 are adjusted such that, in the distance measurement range, reflected light from the reflecting surface 11d and reflected light from the reflecting surface 52 are complementarily and efficiently incident on the light receiving surface 38a of the photodetector 38. Accordingly, even when the distance to an object is changed, the reflected light reflected by the reflecting surface 11d and the reflected light reflected by the reflecting surface 52 complementarily approach and become separated from the light receiving surface 38a of the photodetector 38. Thus, even when the distance to an object is changed, the reflected light can be guided to the photodetector 38. Therefore, in a wide range, the distance to an object can be properly measured.

The reflecting surface 52 is formed in the shield cover 50, and the shield cover 50 covers the light receiving unit including the photodetector 38 and various circuits on the board 40, thereby suppressing noise generated in the photodetector 38 due to electromagnetic waves. Since the shield cover 50 is formed with the reflecting surface 52 while reducing noise due to electromagnetic waves, the configuration of the distance measuring device 1 can be simplified.

Modifications of Embodiment 2

The configuration of the distance measuring device 1 can be modified in various ways other than the configuration shown in Embodiment 2 described above.

For example, in Embodiment 2 described above, the reflecting surface 11d is formed in the support base 11, and the reflecting surface 52 is formed in the shield cover 50. However, the two reflecting surfaces 11d and 52 may be integrally provided to one member.

In Embodiment 2 described above, the reflecting surfaces 11d and 52 are curved surfaces along the circumferential direction, but the shapes of the reflecting surfaces 11d and 52 are not limited thereto, and each of the reflecting surfaces 11d and 52 may be, for example, a flat surface forming the inner surface of a polygonal prism. Also in the case where the reflecting surfaces 11d and 52 are flat surfaces, the tilt angles of the reflecting surface 11d and the reflecting surface 52 are adjusted such that, in the distance measurement range, reflected light from the reflecting surface 11d and reflected light from the reflecting surface 52 are complementarily and efficiently incident on the light receiving surface 38a of the photodetector 38. In this case as well, to more efficiently guide reflected light to the light receiving surface 38a of the photodetector 38, it is preferable that the reflecting surfaces 11d and 52 are curved surfaces as in Embodiment 2 described above.

In the case where the reflecting surfaces 11d and 52 are flat surfaces, reflected light reflected by the reflecting surfaces 11d and 52 is less likely to be converged as compared to the case where the reflecting surfaces 11d and 52 are curved surfaces that coincide with conical surfaces as in Embodiment 2 described above. Thus, to more efficiently guide reflected light to the light receiving surface 38a of the photodetector 38, it is preferable that the reflecting surfaces 11d and 52 are curved surfaces as in Embodiment 2 described above.

In Embodiment 2 described above, the two reflecting surfaces 11d and 52 having different tilt angles relative to the optical axis direction of the condensing lens 35 (Z-axis direction) are not limited to be provided so as to be aligned in the Z-axis direction, and, for example, a third reflecting surface having a different tilt angle may further be provided so as to be aligned therewith in the Z-axis direction. In this case as well, the tilt angles, the widths in the direction parallel to the rotation center axis R10, and the widths (areas) in the direction perpendicular to the rotation center axis R10, of the three types of reflecting surfaces are adjusted such that, in the distance measurement range, reflected light from the three types of reflecting surfaces is complementarily and efficiently incident on the light receiving surface 38a of the photodetector 38.

Also in Embodiment 2 described above, similar to the configuration shown in FIG. 10, the width in the X-axis direction of the mirror 34 may be decreased. In this case as well, the amount of reflected light guided to the photodetector 38 is decreased as compared to the configuration of Embodiment 2 shown in FIG. 13, but the height of the distance measuring device 1 can be reduced.

Also in Embodiment 2 described above, the light source and the collimator lens 32 may be disposed at a position separate from the condensing lens 35. For example, similar to the configuration shown in FIGS. 12A and 12B, the light source 31 and the collimator lens 32 may be disposed on the X-axis negative side of the rotation center axis R10.

Also in Embodiment 2 described above, the light source 31 and the collimator lens 32 may be disposed on the rotary part 20 side. However, in this case, a configuration for supplying power from the fixing part 10 side to the rotary part 20 side is needed. Thus, it can be said that, in order to stably drive the light source 31 with a simple configuration, it is preferable to dispose the light source 31 on the fixing part 10 side as in the configuration of Embodiment 2 described above and the configuration in FIGS. 12A and 12B.

The structure according to the present invention can also be applied to a device that does not have a distance measurement function and has only a function of detecting whether or not an object exists in the projection direction, on the basis of a signal from the photodetector 38. In this case as well, even when the distance to an object is short, reflected light can be guided to the photodetector 38 by at least either of the reflecting surfaces 11*d* and 52 in accordance with the distance to the object. Thus, the presence/absence of an object in a wide range can be properly detected.

In addition to the above, various modifications can be made as appropriate to the embodiments of the present invention, without departing from the scope of the technological idea defined by the claims.

What is claimed is:

1. A distance measuring device for applying laser light to a distance measurement region and measuring a distance to an object that exists in the distance measurement region, the distance measuring device comprising:
   - a condensing lens configured to condense reflected light, of the laser light, reflected by the object;
   - a tubular adjustment member disposed at a stage subsequent to the condensing lens and having a first reflecting surface and a second reflecting surface formed on an inner surface on which the reflected light condensed by the condensing lens is incident, a tilt angle of the second reflecting surface relative to an optical axis of the condensing lens being different from that of the first reflecting surface; and
   - a photodetector configured to receive the reflected light that has traveled through the adjustment member, wherein, in the adjustment member, a plurality of the first reflecting surfaces and a plurality of the second reflecting surfaces are formed so as to be alternately aligned in a circumferential direction.

2. The distance measuring device according to claim 1, wherein the first reflecting surface and the second reflecting surface are provided at positions symmetrical with respect to the optical axis of the condensing lens.

3. The distance measuring device according to claim 1, wherein the condensing lens, the first reflecting surface, and the second reflecting surface are configured such that, when an object exists at a farthest position in a distance measurement range, the reflected light is condensed directly on the photodetector without being reflected by any of the first reflecting surface and the second reflecting surface.

4. The distance measuring device according to claim 1, wherein a light source configured to emit the laser light is installed so as to be embedded at a center of the condensing lens.

\* \* \* \* \*